United States Patent
Shigetomo et al.

(10) Patent No.: US 9,088,185 B2
(45) Date of Patent: Jul. 21, 2015

(54) ELECTROMECHANICAL ACTUATOR, ELECTROMECHANICAL-ACTUATOR POWER DISCONNECTION METHOD, AND ELECTROMECHANICAL-ACTUATOR POWER DISCONNECTION APPARATUS

(71) Applicant: Nabtesco Corporation, Tokyo (JP)

(72) Inventors: Ryota Shigetomo, Gifu (JP); Yasuyuki Shirai, Gifu (JP)

(73) Assignee: Nabtesco Corporation, Tokyo (JP)

( * ) Notice: Subject to any disclaimer, the term of this patent is extended or adjusted under 35 U.S.C. 154(b) by 220 days.

(21) Appl. No.: 13/665,265

(22) Filed: Oct. 31, 2012

(65) Prior Publication Data
US 2013/0106215 A1    May 2, 2013

(30) Foreign Application Priority Data

Nov. 2, 2011 (JP) .................................. 2011-241648

(51) Int. Cl.
| | |
|---|---|
| H02K 7/10 | (2006.01) |
| H02K 7/06 | (2006.01) |
| H02K 7/112 | (2006.01) |
| H02K 7/00 | (2006.01) |
| F16D 7/10 | (2006.01) |
| F16D 43/208 | (2006.01) |
| H02K 7/108 | (2006.01) |
| F16D 28/00 | (2006.01) |
| F16D 23/12 | (2006.01) |

(52) U.S. Cl.
CPC .. *H02K 7/06* (2013.01); *F16D 7/10* (2013.01); *F16D 43/208* (2013.01); *H02K 7/003* (2013.01); *H02K 7/112* (2013.01); *F16D 28/00* (2013.01); *F16D 2023/123* (2013.01); *H02K 7/108* (2013.01); *H02K 2213/06* (2013.01)

(58) Field of Classification Search
CPC ....................................................... H02K 7/06
USPC ............................................... 310/78, 80, 83
See application file for complete search history.

(56) References Cited

U.S. PATENT DOCUMENTS

| | | | |
|---|---|---|---|
| 5,214,972 A | 6/1993 | Larson et al. | |
| 6,158,557 A * | 12/2000 | Leitermann et al. | 188/71.8 |
| 6,453,761 B1 * | 9/2002 | Babinski | 74/89.34 |
| 6,607,059 B1 * | 8/2003 | Kapaan et al. | 188/72.8 |
| 2005/0103928 A1 | 5/2005 | Flatt | |
| 2008/0309179 A1 * | 12/2008 | Eberlein et al. | 310/80 |

* cited by examiner

*Primary Examiner* — Hanh Nguyen
(74) *Attorney, Agent, or Firm* — Studebaker & Brackett PC

(57) ABSTRACT

An electromechanical actuator is provided with a power disconnection mechanism including a case portion, inner shaft portion, supporting portions, and connecting members. The case portion is fixed to an electric motor. The inner shaft portion within the case portion is fixed to a screw portion. The supporting portions are installed so as to support a load parallel to the axial direction between the case portion and the inner shaft portion, inserted into the inner shaft portion, and slidable along axial grooves and circumferential grooves with respect to the case portion. The connecting members break connection between the case portion and the inner shaft portion and disconnect transmission of power when torque of a prescribed amount or larger acts.

8 Claims, 16 Drawing Sheets

ELECTROMECHANICAL ACTUATOR, ELECTROMECHANICAL-ACTUATOR POWER DISCONNECTION METHOD, AND ELECTROMECHANICAL-ACTUATOR POWER DISCONNECTION APPARATUS

CROSS-REFERENCE TO RELATED APPLICATION

This application claims priority to Japanese Patent Application No. 2011-241648. The entire disclosure of Japanese Patent Application No. 2011-241648 is hereby incorporated herein by reference.

BACKGROUND OF THE INVENTION

1. Field of the Invention

The present invention relates to an electromechanical actuator provided with an electric motor, a power transmission mechanism that has a nut portion and a screw portion and converts driving force in a rotational direction into driving force in a linear direction and transmitting the driving force, and an output portion that is displaced in a linear direction and outputs the driving force, and an electromechanical-actuator power disconnection method and an electromechanical-actuator power disconnection apparatus for breaking connection of a driving force transmission path in the electromechanical actuator and disconnecting transmission of power.

2. Description of the Related Art

Conventionally, electromechanical actuators for driving various kinds of equipment by being displaced to extend and contract along a linear direction are used as actuators for driving equipment in various fields such as, for example, aircrafts. Such an electromechanical actuator is provided with an electric motor, a power transmission mechanism that has a nut portion and a screw portion and converts driving force in a rotational direction into driving force in a linear direction and transmitting the driving force, and an output portion that is displaced in a linear direction and outputs the driving force. With such an electromechanical actuator, a jammed state may occur in the above-mentioned power transmission mechanism due to tortion, seizure, or the like.

To prepare for occurrence of the above-mentioned jammed state, it is important for electromechanical actuators to be able to maintain reliability of operation of equipment to be driven as a result of the electromechanical actuators being capable of shifting, in the case of occurrence of the jammed state, to a state where the equipment to be driven can operate. For example, in the case where equipment is driven by an actuator other than an electromechanical actuator in which the jammed state occurs, the electromechanical actuator is provided with a structure that enables this electromechanical actuator to follow operation of the other actuator without impeding the operation of the other actuator, thereby maintaining the reliability of the operation of the equipment.

U.S. Pat. No. 5,214,972 discloses an electromechanical actuator provided with a first actuator and a second actuator so as to extend in opposite directions on the same axis. In this electromechanical actuator, each of the first and second actuators is provided with a power transmission mechanism serving as a ball screw mechanism, and an electric motor. With this configuration, even if the jammed state occurs in the power transmission mechanism in one of the first and second actuators, the electromechanical actuator can shift to a state where the equipment to be driven can operate. In other words, when the jammed state has occurred in one of the first and second actuators, the equipment to be driven can operate by the other actuator provided so as to extend on the same axis as, and in the direction opposite to, the actuator in which the jammed state has occurred.

US Patent Application Publication No. 2005/0103928 discloses the second embodiment of an electromechanical actuator provided with an electric motor serving as a driving power source, an output portion, a power transmission mechanism serving as a ball screw mechanism, and a power disconnection mechanism capable of breaking connection of a driving force transmission path between the power transmission mechanism and the output portion and disconnecting transmission of power. The above-mentioned power disconnection mechanism in this electromechanical actuator is configured as an electromechanical clutch mechanism capable of breaking connection between a nut portion in the power transmission mechanism and the output portion.

The electromechanical clutch mechanism is provided with a clutch-driving electric motor that is separate from the above-mentioned electric motor serving as the driving power source. This electromechanical clutch mechanism is further provided with mechanisms such as a gear mechanism for transmitting driving force of the clutch-driving electric motor, and a locking plate that is provided among the gear mechanism, the nut portion, and the output portion, and has a mesh structure and an engagement structure therefor.

SUMMARY OF THE INVENTION

According to the electromechanical actuator disclosed in U.S. Pat. No. 5,214,972, it is possible to shift to a state where the equipment to be driven can operate when the jammed state has occurred. Meanwhile, this electromechanical actuator needs double actuators each of which has a power transmission mechanism and an electric motor, and is provided so as to extend on the same axis in an opposite direction to each other. Therefore the mechanisms become more complicated, and the structure thereof becomes larger. Moreover, it also leads to heavier weight.

According to the electromechanical actuator disclosed in US Patent Application Publication No. 2005/0103928, if the jammed state has occurred therein, it is possible to break connection between the nut portion and the output portion and shift to a state where the equipment to be driven can operate as a result of operation of the above-mentioned electromechanical clutch mechanism. Meanwhile, this electromechanical actuator needs a clutch-driving electric motor separate from the electric motor serving as a driving power source. Moreover, in addition to the clutch-driving electric motor, mechanisms such as the gear mechanism and the above-mentioned locking plate having a complicated shape are also necessary. Therefore the mechanisms become more complicated, and the structure thereof becomes larger. Moreover, it also leads to heavier weight.

Furthermore, according to the electromechanical actuator disclosed in US Patent Application Publication No. 2005/0103928, it is necessary, when breaking connection between the nut portion and the output portion, to operate the electromechanical clutch mechanism against a heavy load (axial force) acting between the nut portion and the output portion in a direction parallel to the axial direction. Therefore, a large-output clutch-driving electric motor is needed to break the connection between the nut portion and the output portion. It will lead to far larger structure and heavier weight. Consequently, in the case of a small clutch-driving electric motor with small output, it is difficult to break the connection between the nut portion and the output portion and shift to a state where the equipment to be driven can operate.

In light of the foregoing situation, an object of the present invention is to provide an electromechanical actuator capable of easily achieving shift to a state where equipment to be driven can operate when a jammed state has occurred, and with which simpler mechanisms and a smaller structure can be employed, an electromechanical-actuator power disconnection apparatus including this electromechanical actuator, and an electromechanical-actuator power disconnection method used in this electromechanical actuator.

To achieve the above-stated object, the electromechanical actuator according to a first feature of the present invention is an electromechanical actuator provided with: an electric motor that generates driving force in a rotational direction; a power transmission mechanism that has a nut portion and a screw portion, converts the driving force of the electric motor in a rotation direction into driving force in a linear direction, and transmits the driving force as a result of the nut portion and the screw portion rotating relatively to each other; and an output portion that outputs driving force in a linear direction by being displaced together with one of the nut portion and the screw portion that serves as a linear displacement portion that is displaced in the linear direction. This electromechanical actuator is further provided with a power disconnection mechanism capable of breaking connection of a driving force transmission path between the electric motor and one of the nut portion and the screw portion that serves as a rotational portion that rotates upon rotation of the electric motor being transmitted thereto, and disconnecting transmission of power. The power disconnection mechanism includes: a case portion that has a cylindrical hollow portion and is fixed with respect to, or connected via a gear portion to, one of the rotational portion and the electric motor; an inner shaft portion that has a shaft-like portion and is installed within the case portion and is fixed with respect to, or connected via the gear portion to, the other of the rotational portion and the electric motor; a supporting portion that is installed between the case portion and the inner shaft portion so as to be able to support a load acting in a direction parallel to an axial direction of the case portion and the inner shaft portion, integrated with, or inserted into, one of the case portion and the inner shaft portion, and rollable or slidable with respect to the other of the case portion and the inner shaft portion; and a connecting member that connects the case portion to the inner shaft portion, wherein the other of the case portion and the inner shaft portion is provided with an axial groove along which the supporting portion can roll or slide, and that extends parallel to the axial direction of the case portion and the inner shaft portion, and a circumferential groove along which the supporting portion can roll or slide, and that extends along the circumferential direction of the case portion and the inner shaft portion, and the connecting member breaks connection between the case portion and the inner shaft portion and disconnects transmission of the power when torque of a prescribed amount or larger acts between the case portion and the inner shaft portion.

With this configuration, in the electromechanical actuator, power is transmitted between the case portion and the inner shaft portion via the connecting member in a normal operation state in which the connection of the driving force transmission path between the electric motor and one of the nut portion and the screw portion that serves as a rotational portion is not released. On the other hand, if a jammed state in the power transmission mechanism has occurred, torque of a prescribed amount or larger acts between the case portion and the inner shaft portion, and the connecting member breaks the connection between the case portion and the inner shaft portion and disconnects power transmission. At this time, a load (axial force) acting in a direction parallel to the axial direction in the power disconnection mechanism is supported between the supporting portion integrated with, or inserted into, one of the case portion and the inner shaft portion, and a portion that defines the circumferential groove on the other of the case portion and the inner shaft portion. It is thus possible to suppress the above-mentioned axial force acting on the connecting member. Accordingly, when the jammed state has occurred in the power transmission mechanism, torque of a prescribed amount or larger generated between the case portion and the inner shaft portion acts on the connecting member, and the connection between the case portion and the inner shaft portion is easily released.

In the state where the connecting member has released the connection between the case portion and the inner shaft portion, the case portion and the inner shaft portion are displaced relatively to each other in a rotational direction around the axial direction, and the supporting portion is relatively displaced along the circumferential groove. Then the supporting portion is relatively displaced along the circumferential groove, and thus able to move into the axial groove. Thus the supporting portion is able to relatively move along the axial direction, and the case portion and the inner shaft portion are able to be displaced relatively to each other along the axial direction. With this configuration, when the jammed state in the power transmission mechanism has occurred, the connecting member, substantially without being affected by the axial force, operates to disconnect the power transmission, and the case portion and the inner shaft portion are able to be displaced relatively to each other in the axial direction. Therefore, with this electromechanical actuator, it is possible to easily achieve shift to the state where the equipment to be driven can operate.

Furthermore, with the electromechanical actuator of the above-described configuration, it is not necessary to provide double actuators such as in the electromechanical actuator disclosed in U.S. Pat. No. 5,214,972. Furthermore, with the electromechanical actuator of the above-described configuration, such a configuration as that of the electromechanical actuator disclosed in US Patent Application Publication No. 2005/0103928 is not needed either. That is, with the electromechanical actuator of the above-described configuration, mechanisms such as a clutch-driving electric motor separate from the electric motor serving as a driving power source, a gear mechanism, and a locking plate having a complicated shape are not needed either. Accordingly, with the electromechanical actuator of the above-described configuration, it is possible to employ simpler mechanisms a smaller structure.

Accordingly, with the above-described configuration, it is possible to provide the electromechanical actuator capable of easily achieving shift to the state where the equipment to be driven can operate when the jammed state has occurred, and with which simpler mechanisms and a smaller structure can be employed.

The electromechanical actuator according to a second feature of the present invention is the electromechanical actuator of the first feature, wherein the supporting portion is formed in a ball shape, and is inserted into one of the case portion and the inner shaft portion.

With this configuration, the supporting portion is formed in a ball shape to be inserted into the case portion or the inner shaft portion. It is therefore possible to easily form the structure of the supporting portion that is held by one of the case portion and the inner shaft portion, and smoothly rolls or slides with respect to the other.

The electromechanical actuator according to a third feature of the present invention is the electromechanical actuator of the second feature, wherein one of the case portion and the inner shaft portion is provided with a concave portion that is concavely formed so that the supporting portion can be inserted therein, and the concave portion is provided as a semispherical hole or a long-hole groove.

With this configuration, the concave portion into which the ball-shaped supporting portion is inserted is provided as a semispherical hole or a long-hole groove. It is therefore possible to easily hold the ball-shaped supporting portion so as to smoothly roll or slide with respect to the other of the case portion and the inner shaft portion. Furthermore, in the case where the concave portion is provided as a long-hole groove, it is possible to hold the ball-shaped supporting portion so as to more smoothly roll with respect to the other of the case portion and the inner shaft portion.

The electromechanical actuator according to a fourth feature of the present invention is the electromechanical actuator of any one of the first to third feature, wherein the connecting member is provided as a pin-shaped member that breaks when the torque of the prescribed amount or larger acts between the case portion and the inner shaft portion, or as a clutch member whose engagement with one of the case portion and the inner shaft portion is released when the torque of a prescribed amount or larger acts between the case portion and the inner shaft portion.

With this configuration, the connecting member is provided as the pin-shaped member that breaks under the load of the prescribed amount or larger, or the clutch member for cancelling the engagement for connection under the load of the prescribed amount or larger. It is therefore possible to achieve the connecting member of a simple structure for breaking the connection between the case portion and the inner shaft portion when the torque of the prescribed amount or larger acts between the case portion and the inner shaft portion, and disconnecting power transmission.

Furthermore, the electromechanical-actuator power disconnection method according to a feature of the present invention to achieve the foregoing object is an electromechanical-actuator power disconnection method, used in an electromechanical actuator including: an electric motor that generates driving force in a rotational direction; a power transmission mechanism that has a nut portion and a screw portion, converts the driving force of the electric motor in a rotation direction into driving force in a linear direction, and transmits the driving force as a result of the nut portion and the screw portion rotating relatively to each other; and an output portion that outputs driving force in a linear direction by being displaced together with one of the nut portion and the screw portion that serves as a linear displacement portion that is displaced in the linear direction. This electromechanical-actuator power disconnection method is for breaking connection of a driving force transmission path between the electric motor and one of the nut portion and the screw portion that serves as a rotational portion that rotates upon rotation of the electric motor being transmitted thereto, and disconnecting transmission of power. The method comprises a control step of controlling the electromechanical actuator further including a power disconnection mechanism capable of breaking connection of the transmission path and disconnecting transmission of power. The power disconnection mechanism includes: a case portion that has a cylindrical hollow portion and is fixed with respect to, or connected via a gear portion to, one of the rotational portion and the electric motor; an inner shaft portion that has a shaft-like portion and is installed within the case portion and is fixed with respect to, or connected via the gear portion to, the other of the rotational portion and the electric motor; a supporting portion that is installed between the case portion and the inner shaft portion so as to be able to support a load acting in a direction parallel to an axial direction of the case portion and the inner shaft portion, integrated with, or inserted into, one of the case portion and the inner shaft portion, and is rollable or slidable with respect to the other of the case portion and the inner shaft portion; and a connecting member that connects the case portion to the inner shaft portion, wherein the other of the case portion and the inner shaft portion is provided with an axial groove in which the supporting portion can roll or slide, and that extends parallel to the axial direction of the case portion and the inner shaft portion, and a circumferential groove in which the supporting portion can roll or slide, and that extends along the circumferential direction of the case portion and the inner shaft portion. In the control step, upon a jammed state in the power transmission mechanism being detected, current with which torque that exceeds an upper-limit torque value that is set as an upper limit of an amount of the torque at the time of operation of the electromechanical actuator can be generated is supplied to the electric motor for a prescribed time period, and as a result of the torque that exceeds the upper-limit torque value being output by the electric motor, the torque of a prescribed amount or larger acts between the case portion and the inner shaft portion, the connecting member breaks the connection between the case portion and the inner shaft portion, and transmission of power is disconnected.

This configuration is able to achieve the same effect as that of the electromechanical actuator of the first feature. That is, it is possible with the electromechanical actuator to easily achieve shift to the state where the equipment to be driven can operate when the jammed state has occurred, and employ simpler mechanisms and a smaller structure. With this electromechanical-actuator power disconnection method, it is possible in the control step to easily break the connection of the driving force transmission path between the electric motor and one of the nut portion and the screw portion that serves as the rotational portion and disconnect power transmission by supplying the current with which the torque that exceeds the upper-limit torque value can be generated to the electric motor only for a prescribed time period when the jammed state is detected. The above-mentioned prescribed time period may be set to a very short time period. Even in this case, it is possible to apply a load of a prescribed amount or larger to the connecting member and break the connection between the case portion and the inner shaft portion. Note that in the case of the electromechanical actuator disclosed in US Patent Application Publication No. 2005/0103928, the clutch-driving electric motor operates even when the jammed state is detected by error, and power transmission is therefore forcibly disconnected. On the other hand, with the above-described configuration, even if the jammed state is detected by error and the current with which the torque that exceeds the upper-limit torque value can be generated is supplied to the electric motor, the connection between the case portion and the inner shaft portion is not released unless the jammed state actually has occurred, and it is possible to prevent power transmission from being disconnected by error.

Furthermore, the electromechanical-actuator power disconnection apparatus according to a feature of the present invention to achieve the foregoing object is an electromechanical-actuator power disconnection apparatus, comprising an electromechanical actuator including: an electric motor that generates driving force in a rotational direction; a power transmission mechanism that has a nut portion and a screw portion, converts the driving force of the electric motor in a rotation direction into driving force in a linear direction, and transmits the driving force as a result of the nut portion and the screw portion rotating relatively to each other; and an output portion that outputs driving force in a linear direction by being displaced together with one of the nut portion and the screw portion that serves as a linear displacement portion that is displaced in the linear direction. This electromechanical-actuator power disconnection apparatus is for breaking connection of a driving force transmission path between the electric motor and one of the nut portion and the screw portion that serves as a rotational portion that rotates upon rotation of the electric motor being transmitted thereto, and disconnecting transmission of power, and further comprising: a power disconnection mechanism that is provided in the electromechanical actuator and is capable of breaking connection of the transmission path and disconnecting transmission of power; and a control portion that controls the electromechanical actuator. The power disconnection mechanism includes: a case portion that has a cylindrical hollow portion and is fixed with respect to, or connected via a gear portion to, one of the rotational portion and the electric motor; an inner shaft portion that has a shaft-like portion and is installed within the case portion and is fixed with respect to, or connected via the gear portion to, the other of the rotational portion and the electric motor; a supporting portion that is installed between the case portion and the inner shaft portion so as to be able to support a load acting in a direction parallel to an axial direction of the case portion and the inner shaft portion, integrated with, or inserted into, one of the case portion and the inner shaft portion, and is rollable or slidable with respect to the other of the case portion and the inner shaft portion; and a connecting member that connects the case portion to the inner shaft portion, wherein the other of the case portion and the inner shaft portion is provided with an axial groove in which the supporting portion can roll or slide, and that extends parallel to the axial direction of the case portion and the inner shaft portion, and a circumferential groove in which the supporting portion can roll or slide, and that extends along the circumferential direction of the case portion and the inner shaft portion, the control portion supplies, upon a jammed state in the power transmission mechanism being detected, current with which torque that exceeds an upper-limit torque value that is set as an upper limit of an amount of the torque at the time of operation of the electromechanical actuator can be generated, to the electric motor for a prescribed time period, and as a result of the torque that exceeds the upper-limit torque value being output by the electric motor, the torque of a prescribed amount or larger acts between the case portion and the inner shaft portion, the connecting member breaks the connection between the case portion and the inner shaft portion, and transmission of power is disconnected.

This configuration is able to achieve the same effect as that of the electromechanical actuator of the first feature. That is, it is possible with the electromechanical actuator to easily achieve shift to the state where the equipment to be driven can operate when the jammed state has occurred, and employ simpler mechanisms and a smaller structure. With this electromechanical-actuator power disconnection apparatus, under the control of the control portion the current with which the torque that exceeds the upper-limit torque value can be generated is supplied to the electric motor only for the prescribed time period when the jammed state is detected, and it is thereby possible to easily break the connection of the driving force transmission path between the electric motor and one of the nut portion and the screw portion that serves as the rotational portion, and disconnect power transmission. The above-mentioned prescribed time period may be set to a very short time period. Even in this case, it is possible to apply a load of a prescribed amount or larger to the connecting member and break the connection between the case portion and the inner shaft portion. Furthermore, with the above-described configuration, even if the jammed state is detected by error and the current with which the torque that exceeds the upper-limit torque value can be generated is supplied to the electric motor, the connection between the case portion and the inner shaft portion is not released unless the jammed state has actually occurred, and it is possible to prevent power transmission from being disconnected by error.

It should be appreciated that the above and other objects, features and advantages of the present invention will become apparent from the following description taken in conjunction with the accompanying drawings.

DETAILED DESCRIPTION OF THE INVENTION

Embodiments for implementing the present invention will be hereinafter described with reference to the drawings. Note that the present invention can be widely applied to an electromechanical actuator provided with an electric motor, a power transmission mechanism that has a nut portion and a screw portion, converts driving force in a rotational direction into driving force in a linear direction, and transmitting the driving force, and an output portion that is displaced in a linear direction and outputs the driving force, and an electromechanical-actuator power disconnection method and an electromechanical-actuator power disconnection apparatus for breaking connection of a driving force transmission path in the electromechanical actuator and disconnecting transmission of power. Moreover, the embodiments can be widely used in relation with electromechanical actuators for driving various kinds of equipments. For example, the embodiments can be implemented as an electromechanical actuator for driving equipment installed in an aircraft, helicopter, or a flying object, an electromechanical-actuator power disconnection method used for this electromechanical actuator, and an electromechanical-actuator power disconnection apparatus including this electromechanical actuator.

First Embodiment

Figure 1:
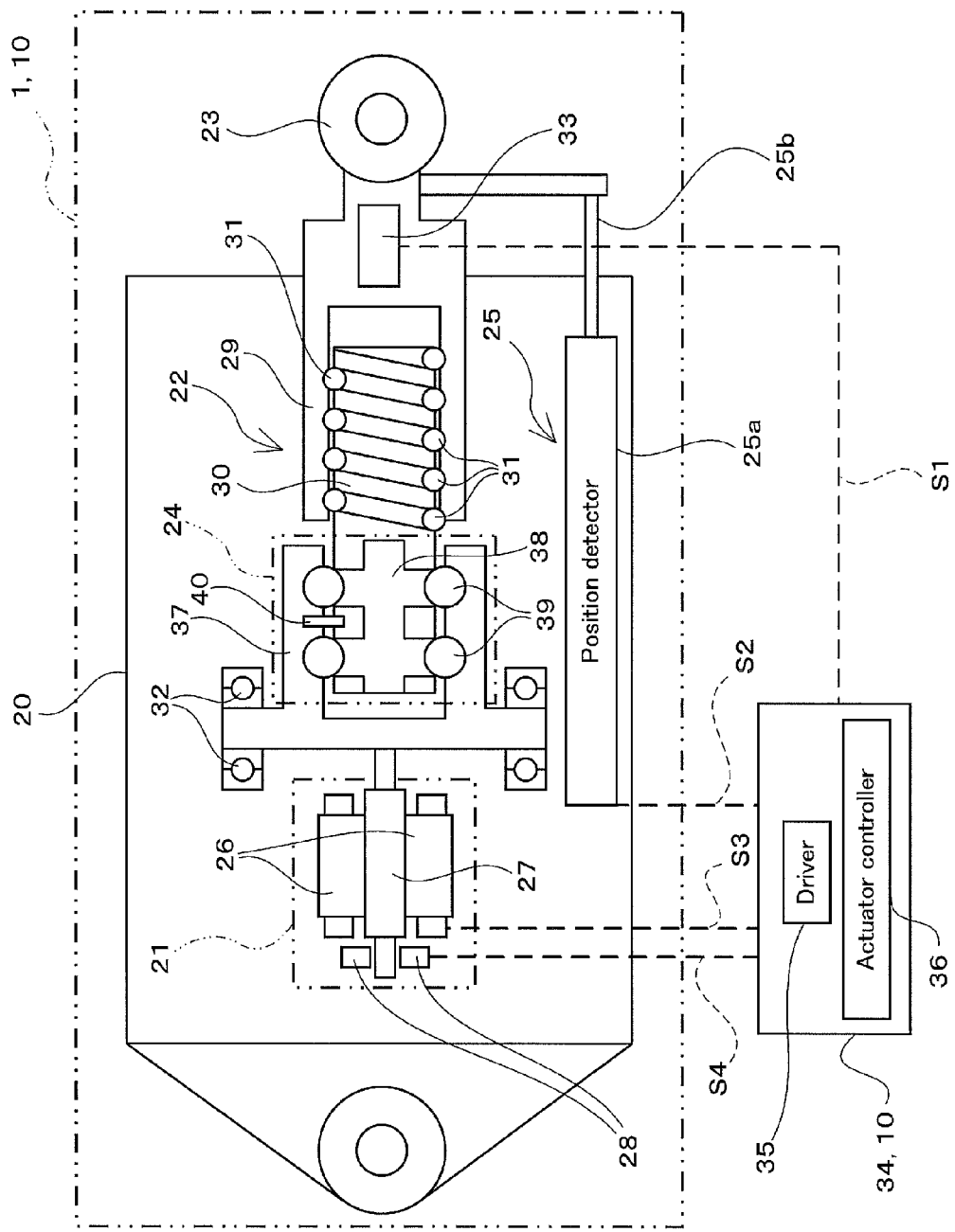
FIG. 1 is a schematic view of an electromechanical actuator according to a first embodiment of the present invention, and an electromechanical-actuator power disconnection apparatus including this electromechanical actuator.

FIG. 1 is a schematic view of an electromechanical actuator 1 according to the first embodiment of the present invention, and an electromechanical-actuator power disconnection apparatus 10 including the electromechanical actuator 1. The electromechanical actuator 1 and the electromechanical-actuator power disconnection apparatus 10 shown in FIG. 1 are used as, for example, an electromechanical actuator for driving a moving surface, which is equipment installed in an aircraft, and an electromechanical-actuator power disconnection apparatus including this electromechanical actuator.

As shown in the schematic view in FIG. 1, the electromechanical actuator 1 is provided with a housing 20, an electric motor 21, a power transmission mechanism 22, an output portion 23, a power disconnection mechanism 24, a position detector 25, and so on. In the electromechanical actuator 1, the housing 20 is installed on equipment on a fixed side, and the output portion 23 is connected to equipment on a movable side. The output portion 23 is displaced with respect to the housing 20 so as to extend and contract in a linear direction, thereby driving the equipment on the movable side. For example, in the case where the electromechanical actuator 1 is used as an actuator for driving a moving surface of an aircraft, the housing 20 is installed pivotably with respect to a wing, and the output portion 23 is installed pivotably with respect to the moving surface. The output portion 23 is displaced with respect to the housing 20 so as to extend and contract in a linear direction, and the moving surface is thereby driven to pivot.

The electric motor 21 is provided as a driving power source for generating driving force in a rotational direction upon current is supplied thereto. The electric motor 21, which is installed in the housing 20, has a stator 26, a rotor 27 that rotates with respect to the stator 26, a resolver 28 provided as a rotation number detector for detecting the number of rotation of the rotor 27 with respect to the stator 26, and so on. The electric motor 21 is capable of forward and reverse rotation, and feedback control is performed based on an instruction from an actuator controller 36 in a control unit 34, which will be discussed later.

The power transmission mechanism 22 has a nut portion 29 and a screw portion 30 that are provided so as to be able to rotate relatively to each other around the same axis, and a plurality of balls 31 provided between the nut portion 29 and the screw portion 30. In other words, in the present embodiment, the power transmission mechanism 22 is provided as a ball screw mechanism, in which the plurality of balls 31 circulate while rolling between thread grooves provided on the inner circumference of the nut portion 29 and thread grooves provided on the outer circumference of the screw portion 30.

The screw portion 30 is rotatably supported together with the power disconnection mechanism 24, which will be described later, that is supported by bearings 32 rotatably with respect to the housing 20 and rotates with the rotor 27. Meanwhile, the nut portion 29 is supported slidably with respect to the housing 20. Thus the power transmission mechanism 22 is configured to convert driving force of the electric motor 21 in a rotational direction into driving force in a linear direction and transmit the driving force as a result of the nut portion 29 and the screw portion 30 rotating relatively to each other.

Furthermore, in the present embodiment, the screw portion 30 rotates around its axis, and the nut portion 29 is thereby displaced parallel to its axial direction. That is, in the power transmission mechanism 22 in the present embodiment, of the nut portion 29 and the screw portion 30, the nut portion 29 constitutes a linear displacement portion that is displaced in a linear direction. Meanwhile, of the nut portion 29 and the screw portion 30, the screw portion 30 constitutes a rotational portion that rotates upon rotation of the electric motor 21 being transmitted thereto.

Note that the power transmission mechanism 22 need only be a mechanism that converts the driving force of the electric motor in a rotational direction into driving force in a linear direction and transmits the driving force as a result of the nut portion and the screw portion rotating relatively to each other, and may alternatively be configured as a mechanism other than a ball screw mechanism. For example, it may alternatively be configured as an acme screw mechanism or a roller screw mechanism.

The output portion 23 is provided as a portion that is displaced together with the nut portion 29, which is the linear displacement portion in the present embodiment, and outputs the driving force in a linear direction. In other words, the output portion 23 is displaced together with the nut portion 29 in a linear direction with respect to the housing 20 as a result of the electric motor 21 operating and the power transmission mechanism 22 converting the driving force of the electric motor 21 in a rotational direction into driving force in a linear direction, and outputs the driving force in the linear direction to the connected equipment to be driven. Note that the output portion 23 may be integrated with the nut portion 29, or may alternatively be fixed to the nut portion 29 directly or via another member.

On the output portion 23, a load sensor 33 is installed. The load sensor 33 has, for example, a strain gauge, and is configured to detect a value of a load acting on the output portion 23 as an electric signal. A load signal S1, which is the electric signal detected by the load sensor 33 as a value of the load acting on the output portion 23, is transmitted to the actuator controller 36 in the control unit 34, which will be described later.

The position detector 25 has a main body case 25a and a probe 25b that is displaced with respect to this main body case 25a, and is provided as a mechanism for detecting a relative position of the probe 25b to the main body case 25a. The main body case 25a is installed within the housing 20, and internally has primary-side and secondary-side coils. The probe 25b is attached to the output portion 23, and is provided so as to be displaced together with the output portion 23. Furthermore, the probe 25b includes a movable core that is relatively displaced within a coil in the main body case 25a. With the above-described configuration, the position detector 25 is configured to detect a displacement of the output portion 23 with respect to the housing 20.

Note that in the position detector 25, a signal based on induced voltage generated by the secondary-side coil as a result of the movable core being displaced in a state where the primary-side coil is excited is output as a position detection signal S2. The output position detection signal S2 is transmitted to the actuator controller 36 in the control unit 34, which will be described later.

The power disconnection mechanism 24 is provided as a mechanism capable of breaking connection of a driving force transmission path between the electric motor 21 and the screw portion 30, which is the rotational portion in the present embodiment, and disconnecting transmission of power. The structure of the power disconnection mechanism 24 will be hereinafter described in detail.

Figure 2A:
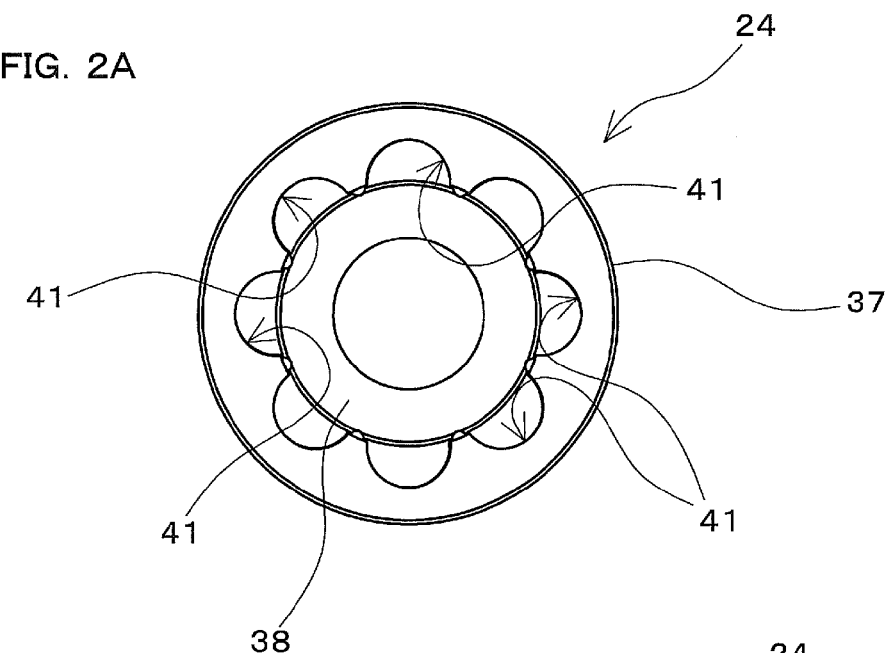
FIG. 2A is a plan view of a power disconnection mechanism in the electromechanical actuator show in FIG. 1.
Figure 2B:
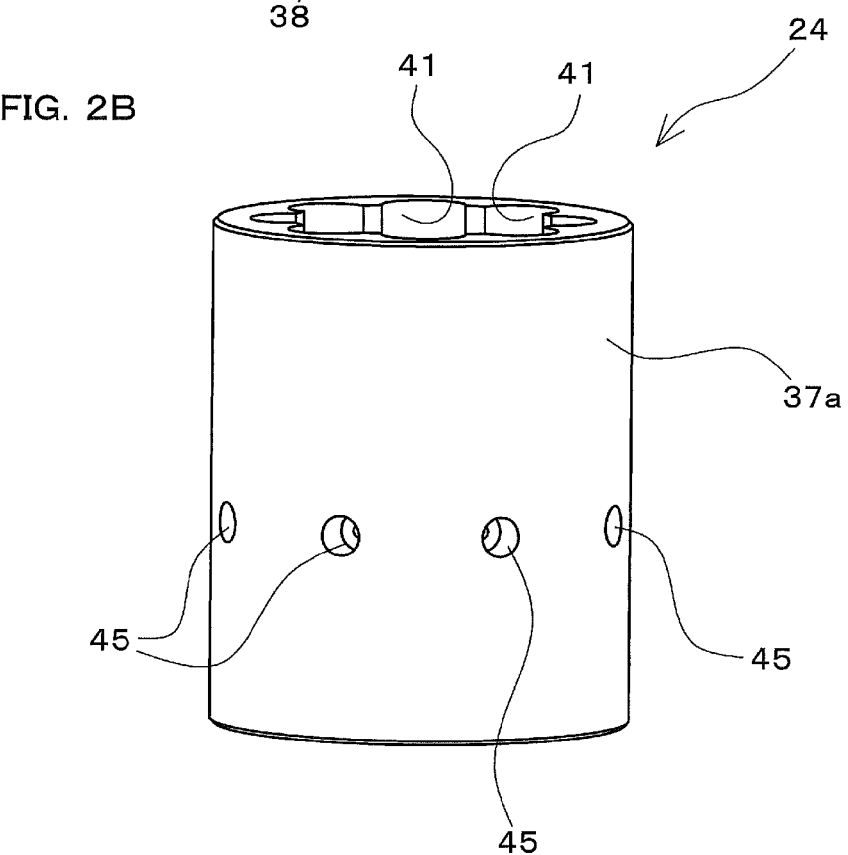
FIG. 2B is an oblique view of a power disconnection mechanism in the electromechanical actuator show in FIG. 1.
Figure 3A:
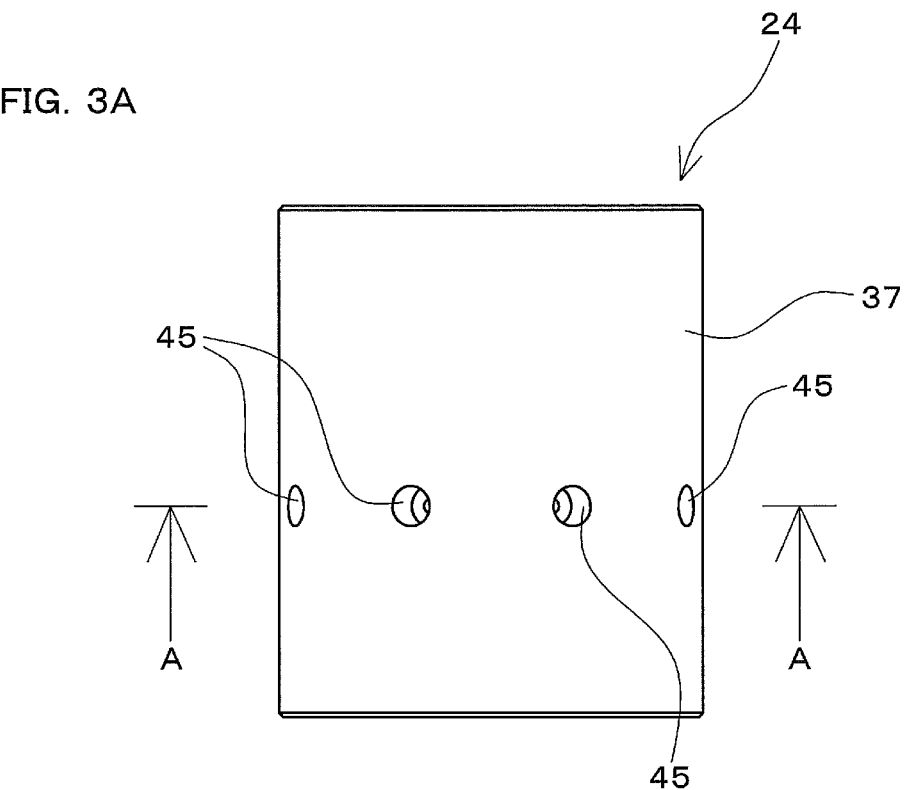
FIG. 3A is a side view of the power disconnection mechanism shown in FIGS. 2A and 2B.
Figure 3B:
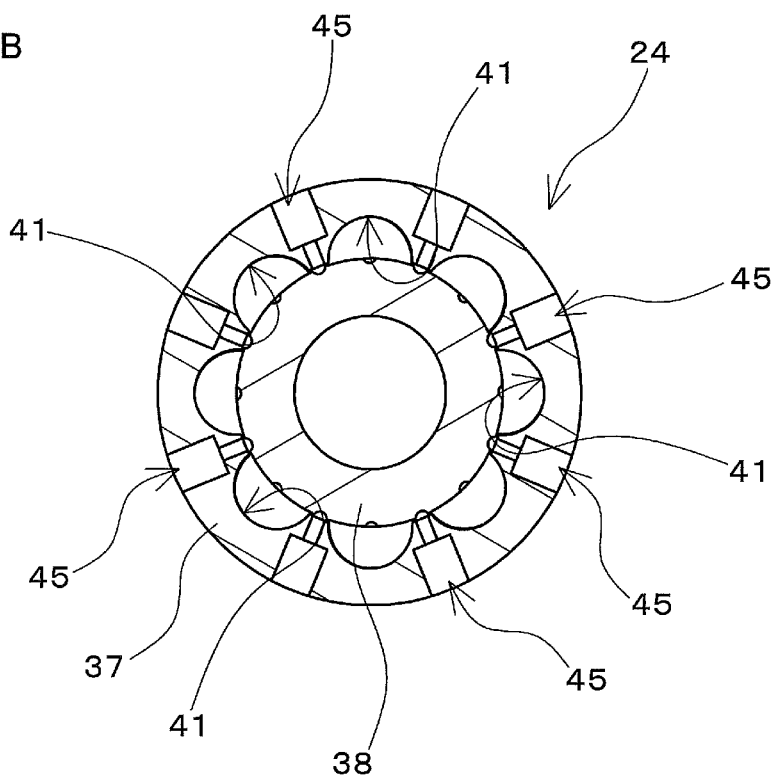
FIG. 3B is a cross-sectional view, viewed along arrows A-A in FIG. 3A.
Figure 4A:
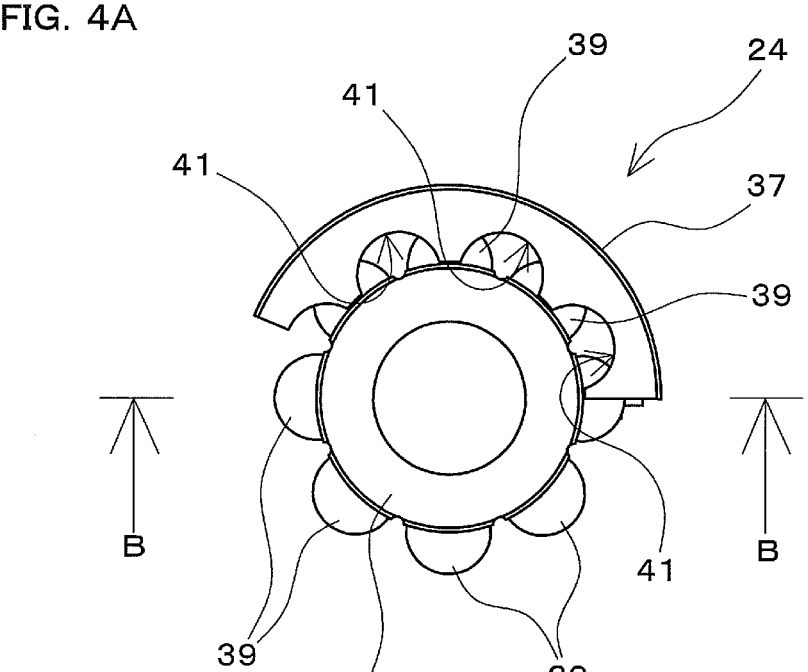
FIG. 4A is a partially cutaway plan view of the power disconnection mechanism shown in FIGS. 2A and 2B.
Figure 4B:
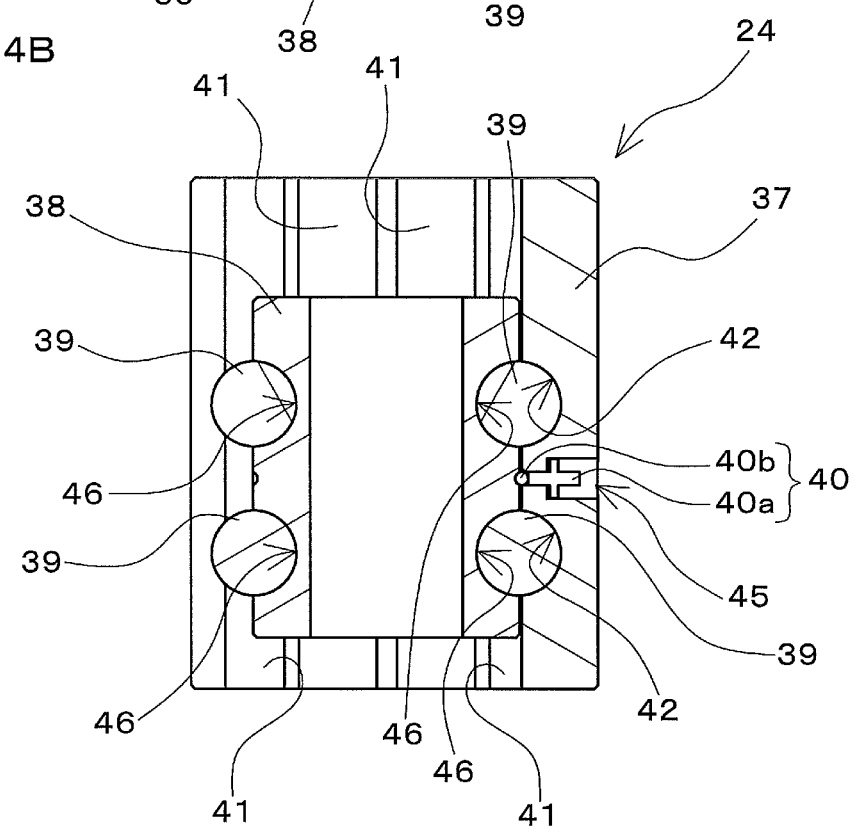
FIG. 4B is a cross-sectional view, viewed along arrows B-B in FIG. 4A.
Figure 5:
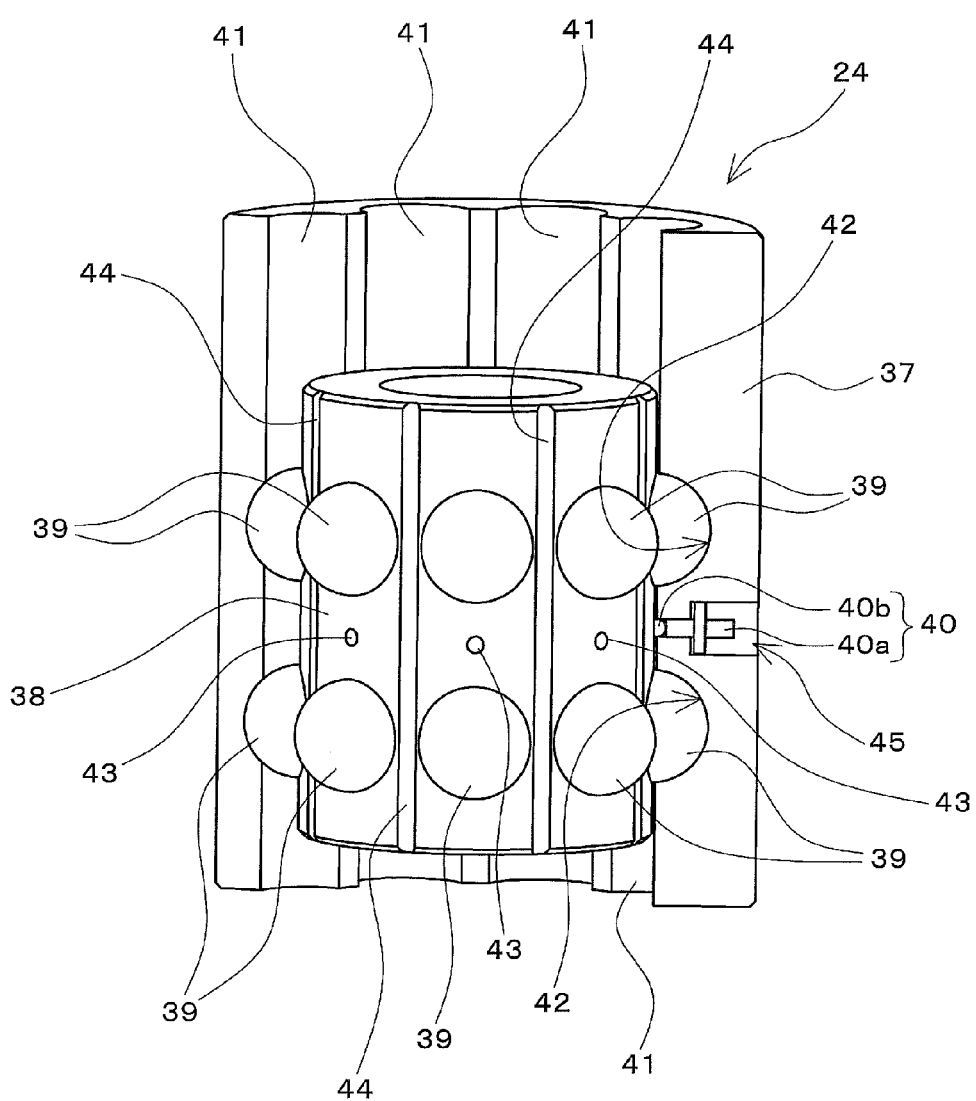
FIG. 5 is an oblique view of the power disconnection mechanism shown in a state of being partially cut away in FIG. 4.
Figure 6A:
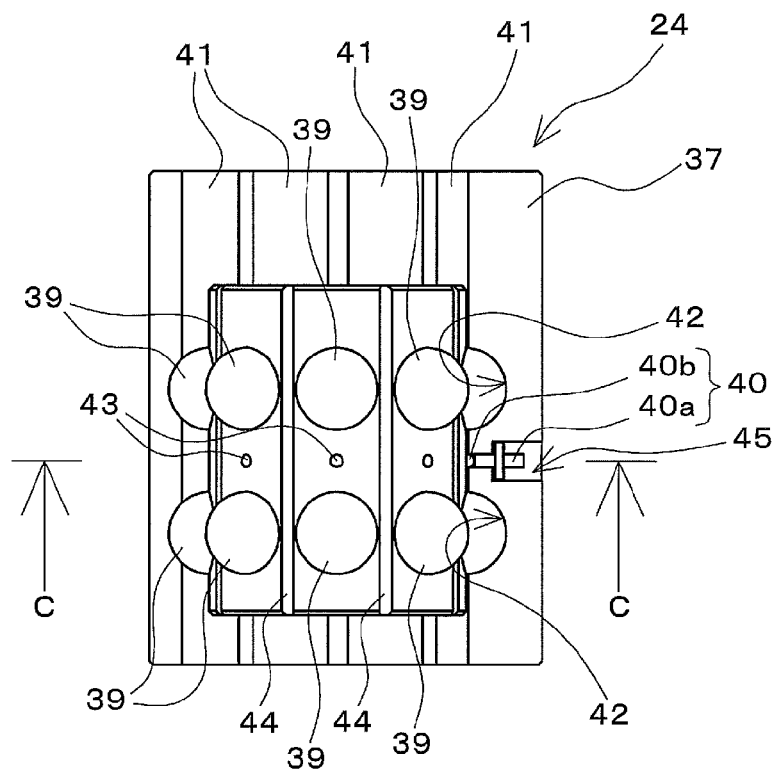
FIG. 6A is a side view of the power disconnection mechanism shown in a state of being partially cut away in FIGS. 4A and 4B.
Figure 6B:
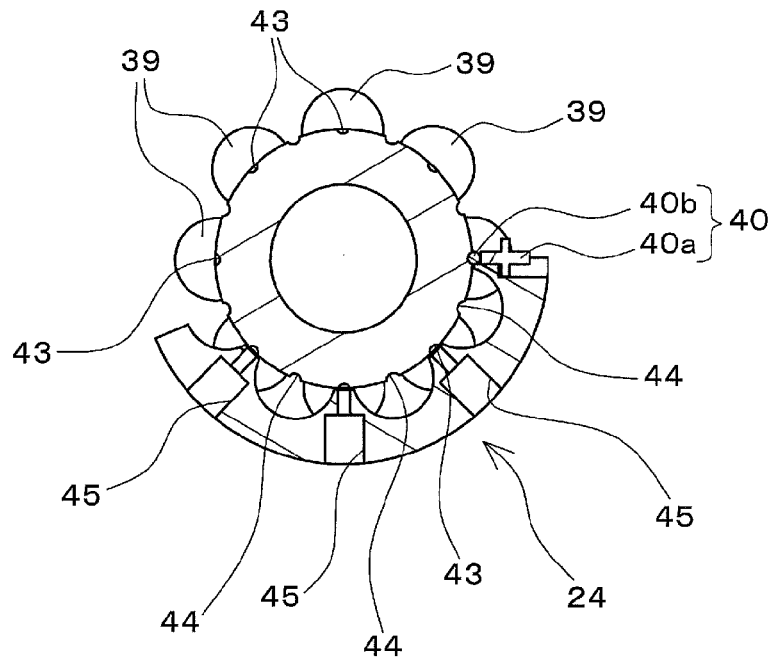
FIG. 6B is a cross-sectional view, viewed along arrows C-C in FIG. 6A.

FIG. 2A is a plan view of the power disconnection mechanism 24, and FIG. 2B is an oblique view thereof. FIG. 3A is a side view of the power disconnection mechanism 24, and FIG. 3B is a cross-sectional view of the power disconnection mechanism 24, viewed along arrows A-A in FIG. 3A. FIG. 4A is a partially cutaway plan view of the power disconnection mechanism 24, and FIG. 4B is a partially cutaway cross-sectional view of the power disconnection mechanism 24, viewed arrows B-B in FIG. 4A, both in a partially cutaway state. FIG. 5 is an oblique view of the power disconnection mechanism 24 shown in a state of being partially cut away in FIGS. 4. FIG. 6A is a side view of the power disconnection mechanism 24 shown in a state of being partially cut away in FIGS. 4, and FIG. 6B is a cross-sectional view of this power disconnection mechanism, viewed along arrows C-C in FIG. 6A.

Note that FIGS. 2 to 6 schematically show the structure of the power disconnection mechanism 24. In FIGS. 2 to 6, from a viewpoint of clearly showing the structure, part of components of the power disconnection mechanism 24 and part of oblique-line hatching showing the cross-sectional state are omitted as needed. Furthermore, in FIGS. 2 to 6, a portion of the power disconnection mechanism 24 fixed with respect to the screw portion 30 and a portion fixed with respect to the electric motor 21 are omitted for the purpose of schematically showing the power disconnection mechanism 24.

The power disconnection mechanism 24 shown in FIGS. 1 to 6 is provided with a case portion 37, an inner shaft portion 38, a plurality of support balls 39, a clutch member 40, and so on.

The case portion 37 has a tubular hollow portion and is fixed with respect to the rotor 27 in the electric motor 21. Note that, as mentioned above, in FIGS. 2 to 6 the structure of the portion of the case portion 37 fixed with respect to the electric motor 21 is not shown (the same applies to FIGS. 9 and 10). The case portion 37 is supported via the bearing 32 rotatably with respect to the housing 20 (see FIG. 1).

The inner shaft portion 38, which has a shaft-shaped portion, is installed within the case portion 37 and fixed with respect to the screw portion 30, which is the rotational portion in the present embodiment. In the present embodiment, the inner shaft portion 38 formed in a cylindrical shape is provided as an example. Note that, as mentioned above, in FIGS. 2 to 6 the structure of the portion of the inner shaft portion 38 fixed with respect to the screw portion 30 is not shown (the same applies to FIGS. 9 and 10).

The plurality of support balls 39 are provided, and constitute a supporting portion in the present embodiment that is installed so as to be able to support a load acting between the case portion 37 and the inner shaft portion 38 in a direction parallel to the axial direction of the case portion 37 and the inner shaft portion 38. Furthermore, the support balls 39 are inserted into the outer circumferential side surface of the inner shaft portion 38, and are installed so as to be above to slide with respect to the case portion 37. Note that in FIGS. 2 and 3, the support balls 39 are omitted.

Here, the configuration in which the support balls 39 inserted in the inner shaft portion 38 are installed slidably with respect to the case portion 37 will be further described in detail. The plurality of support balls 39, each formed in a ball shape, are inserted into the side surface of the inner shaft portion 38 along the outer circumferential direction thereof. In the present embodiment, the plurality of support balls 39 are also inserted onto the outer circumference of the inner shaft portion 38 at two levels in the axial direction of the inner shaft portion 38.

On the outer circumferential side surface of the inner shaft portion 38, a plurality of concave portions 46, each formed in a concave shape into which the respective support balls 39 are inserted, are provided. Each concave portion 46 is provided as a semispherical hole. The concave portions 46, the number of which is the same as that of the support balls 39, are provided along the outer circumference of the inner shaft portion 38 at two levels in the axial direction of the inner shaft portion 38.

FIGS. 7 (7A, 7B, 7C, 7D, 7E, 7F) are schematic views of the shapes of each concave portion 46 and concave portion (47, 48) according to modified examples. FIG. 7A shows the concave portion 46 viewed from the outside of the inner shaft portion 38 in the radial direction thereof, and FIG. 7B is a cross-sectional view of the concave portion 46 and the support ball 39 in a cross section parallel to the axial direction of the inner shaft portion 38. As shown in FIGS. 7A and 7B, the concave portion 46 is provided as a semispherical hole, and the ball-shaped support ball 39 is inserted into this semispherical hole.

Figure 7A:
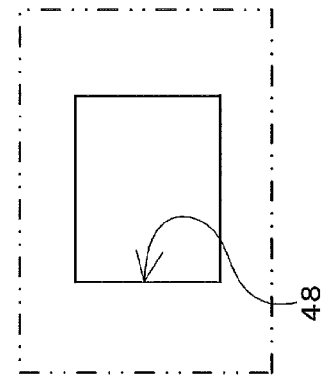
FIG. 7A is a schematic view of the shape of a concave portion provided in an inner shaft portion in the power disconnection mechanism shown in FIGS. 4A and 4B.
Figure 7B:
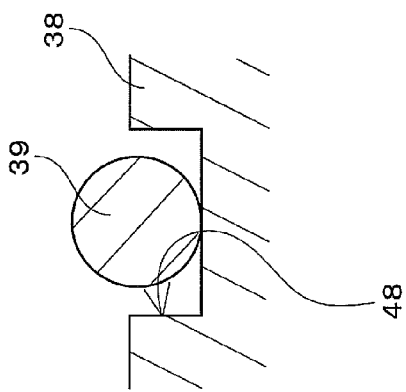
FIG. 7B is a schematic view of the shape of the concave portion provided in the inner shaft portion in the power disconnection mechanism shown in FIGS. 4A and 4B.
Figure 7C:
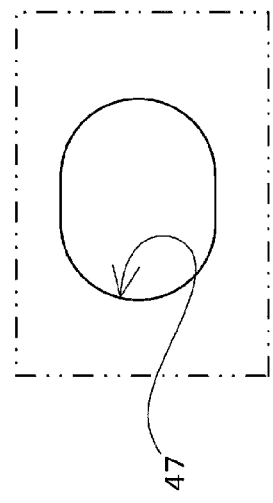
FIG. 7C is a schematic view of a modified example of the shape of the concave portion provided in the inner shaft portion in the power disconnection mechanism shown in FIGS. 4A and 4B.
Figure 7D:
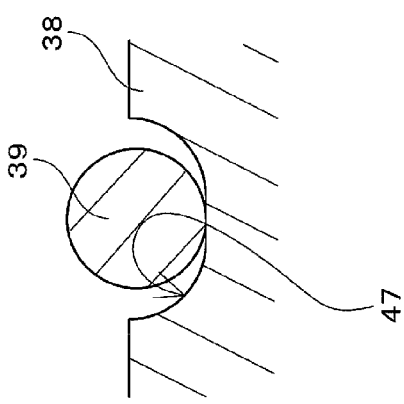
FIG. 7D is a schematic view of the modified example of the shape of the concave portion provided in the inner shaft portion in the power disconnection mechanism shown in FIGS. 4A and 4B.
Figure 7E:
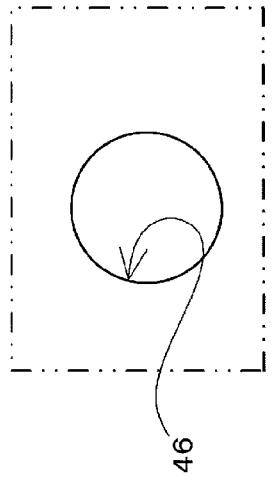
FIG. 7E is a schematic view of another modified example of the shape of the concave portion provided in the inner shaft portion in the power disconnection mechanism shown in FIGS. 4A and 4B.
Figure 7F:
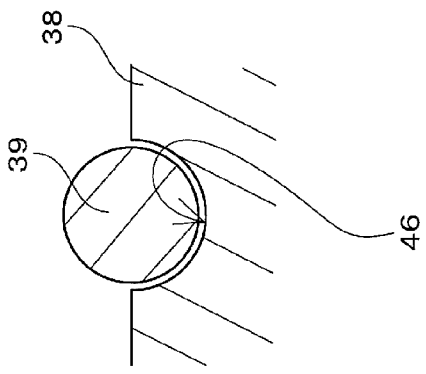
FIG. 7F is a schematic view of the modified example of the shape of the concave portion provided in the inner shaft portion in the power disconnection mechanism shown in FIGS. 4A and 4B.

FIG. 7C shows a concave portion 47 according to a modified example viewed from the outside of the inner shaft portion 38 in the radial direction thereof, and FIG. 7D is a cross-sectional view of the concave portion 47 and the support ball 39 in a cross section parallel to the axial direction of the inner shaft portion 38. FIG. 7E shows a concave portion 48 according to another modified example viewed from the outside of the inner shaft portion 38 in the radial direction thereof, and FIG. 7F is a cross-sectional view of the concave portion 48 and the support ball 39 in a cross section parallel to the axial direction of the inner shaft portion 38. Note that in FIGS. 7D and 7F that show the modified examples, the cross section of the inner shaft portion 38 and the support balls 39, which are components configured similarly to the present embodiment, are denoted by the same reference numerals.

Both the concave portion 47 shown in FIGS. 7C and 7D and the concave portion 48 shown in FIGS. 7E and 7F are provided not as semispherical holes but long-hole grooves. Each support ball 39 is inserted, so as to be able to roll, into the concave portion (47, 48) provided as a long-hole groove. The support ball 39, which is inserted, so as to be able to roll, into the concave portion (47, 48) formed as a long-hole groove on the outer circumference of the inner shaft portion 38, is installed so as to be able to roll with respect to the case portion 37.

The concave portion 47 is formed in a curved surface whose end portions in a direction in which the long hole extends smoothly extend in an arc. Meanwhile, the concave portion 48 has end portions in a direction in which the long hole extends that are formed in flat surfaces. Note that the diameter size of the concave portion 46 provided as a semispherical hole is set to be larger than that of each support ball 39 as appropriate, and the support ball 39 is thereby inserted into the concave portion 46 so as to be able to roll, and this support ball 39 may be installed so as to be able to roll with respect to the case portion 37.

On the inner circumference of the case portion 37, a plurality of axial grooves 41 and a plurality of circumferential grooves 42 are provided. Each axial groove 41 is provided as a groove along which the support ball 39 is slidable, and extends parallel to the axial direction of the case portion 37 and inner shaft portion 38. The cross section of the axial groove 44 perpendicular to the axial direction of the case portion 37 and the inner shaft portion 38 is formed in a semi-arc shape. The plurality of axial grooves 41 are provided side by side along the circumferential direction of the case portion 37. Thus each of the plurality of axial grooves 41 is provided in a spline-groove shape along which the support ball 39 is slidable. Note that the diameter size of each axial groove 41 in the semi-arc cross section is set to be, for example, slightly larger than the diameter size of each support ball 39.

Each circumferential groove 42 is provided as a groove along which the support ball 39 is slidable, and extends in the circumferential direction of the case portion 37 and the inner shaft portion 38. The cross section of each circumferential groove 42 that is perpendicular to the circumferential direction of the case portion 37 and the inner shaft portion 38 (i.e., the cross section parallel to the radial direction and the axial direction) is formed in a semi-arc shape. The circumferential grooves 42 are provided at two levels in the axial direction on the inner circumference of the case portion 37 so as to correspond to the respective support balls 39 installed at two levels in the axial direction on the outer circumference of the inner shaft portion 38. Note that the diameter size of each circumferential groove 42 in the semi-arc cross section is set to be, for example, slightly larger than the diameter size of each support ball 39.

Since the axial grooves 41 and the circumferential grooves 42 are provided as described above, the support balls 39 are able to slide along the axial grooves 41 or the circumferential grooves 42 and thus be displaced in a state where connection between the case portion 37 and the inner shaft portion 38 through the clutch members 40, which will be discussed later, is released. Thus, in the state where the above-mentioned connection through the clutch members 40 is released, the inner shaft portion 38 can be linearly displaced along the axial direction with respect to the case portion 37, or rotate along the circumferential direction with respect to the case portion 37.

Next, the configuration of the clutch members 40 will be described. The clutch members 40 constitute a connecting member for connecting the case portion 37 to the inner shaft portion 38 in the present embodiment. The clutch members 40 are installed in clutch installation holes 45 that are open to the side surface of the case portion 37 and pass through the case portion 37 in the radial direction. A plurality of clutch installation holes 45 are provided along the circumferential direction of the case portion 37, and in the present embodiment, eight clutch installation holes 45 are provided at equiangular intervals in the circumferential direction of the case portion 37, for example. Furthermore, the plurality of clutch members 40 are also installed in the case portion 37 in part or all of the eight clutch installation holes 45. For example, two or four clutch members 40 are installed in two or four clutch installation holes 45 at equiangular intervals in the circumferential direction of the case portion 37. Note that in FIGS. 2 and 3, the clutch members 40 are omitted.

Each clutch member 40 has a clutch shaft 40a and a clutch ball 40b. The clutch shaft 40a is installed in the clutch installation hole 45 so as to extend in the radial direction of the case portion 37. The clutch shaft 40a is provided with a columnar shaft-shaped portion and a disk-shaped portion that projects in a flange shape in the radial direction in the middle of the columnar shaft-shaped portion in its axial direction. The clutch shaft 40a installed in the clutch installation hole 45 is urged in the above-mentioned disk-shaped portion, radially inward of the case portion 37 by a clutch spring configured as a spring member such as a coil spring. Note that in FIGS. 4 to 6, only the clutch member 40 installed in the clutch installation hole 45 is shown, and the clutch spring is omitted.

The diameter size of the hole of the clutch installation hole 45 in a region radially inward of the case portion 37 is set so as to correspond to the diameter size of the columnar shaft-shaped portion of the clutch shaft 40a. Meanwhile, the diameter size of the hole of the clutch installation hole 45 in a region radially outward of the case portion 37 is set so as to correspond to the diameter size of the disk-shaped portion of the clutch shaft 40a. Thus each clutch installation hole 45 is formed as a hole whose diameter becomes smaller step-wise radially inward of the case portion 37. With this configuration, the position where the clutch shaft 40a, which is urged radially inward of the case portion 37 by the clutch spring, projects toward the inside of the case portion 37 is determined.

Each clutch ball 40b is provided as a spherical member and is installed so as to be partially exposed from the inner circumference of the case portion 37 between the end portion of the clutch shaft 40a on the inner side of the case portion 37 in its radial direction and the side surface of the inner shaft portion 38 on its outer circumference. Thus the clutch ball 40b is abutted against the outer circumferential side surface of the inner shaft portion 38 by the clutch shaft 40a urged by the clutch spring.

On the side surface of the inner shaft portion 38, a plurality of clutch holes 43 are concavely formed along the outer circumferential direction. Each clutch hole 43 is provided as a semispherical hole having a diameter size corresponding to the diameter size of the clutch ball 40b, and is able to be engaged with the clutch ball 40b exposed from the inner circumference of the case portion 37. In a state where the clutch balls 40b are engaged with the clutch holes 43, the case portion 37 and the inner shaft portion 38 are connected to each other through the clutch member 40, which is the connecting member.

In a state where the clutch balls 40b are engaged with the clutch holes 43 and the case portion 37 and the inner shaft portion 38 are thus connected to each other, the case portion 37 and the inner shaft portion 38 integrally rotate, and therefore, the driving force transmitted from the rotor 27 of the electric motor 21 in a rotational direction is transmitted to the screw portion 30 in the power transmission mechanism 22. Thus the rotor 27 and the screw portion 30 rotate integrally through the case portion 37 and the inner shaft portion 38.

Further, as shown in FIGS. 4A to 6B, in the state where the case portion 37 and the inner shaft portion 38 are connected to each other via the clutch member 40, each support ball 39 inserted into the inner shaft portion 38 is supported so as to come in contact, in a direction parallel to the axial direction of the inner shaft portion 38 and the case portion 37, with a portion defining the circumferential groove 42 on the inner circumference of the case portion 37. Thus a load (axial force) acting in a direction parallel to the axial direction in the power disconnection mechanism 24 is supported between the support balls 39 inserted into the inner shaft portion 38 and the portions defining the circumferential grooves 42 in the case portion 37.

On the other hand, when a jammed state has occurred in the power transmission mechanism 22 and torque of a prescribed amount or larger acts between the case portion 37 and the inner shaft portion 38, the clutch balls 40b in the clutch members 40 are pushed back by the outer circumferential side surface of the inner shaft portion 38 against urging force of the clutch springs. At this time, in the clutch members 40, engagement of the clutch balls 40b with the clutch holes 43 is released. That is, in the above case, the clutch members 40 are displaced radially outward of the case portion 37 against the urging force of the clutch springs, and the engagement of the clutch members 40 with the inner shaft portion 38 is released. Thus the clutch members 40 are configured to break the connection between the case portion 37 and the inner shaft portion 38 and disconnect transmission of motive force when the torque of a prescribed amount or larger acts between the case portion 37 and the inner shaft portion 38.

Furthermore, on the outer circumferential side surface of the inner shaft portion 38, a plurality of clutch grooves 44 that extend parallel to the axial direction of the inner shaft portion 38 are provided. Each clutch groove 44 is provided as a groove along which the clutch ball 40b can slide or roll. The cross section of the clutch groove 44 perpendicular to the axial direction of the inner shaft portion 38 is formed in a semi-arc shape. Note that the diameter size of the clutch groove 44 in the semi-arc cross section is set to be, for example, slightly larger than the diameter size of the clutch ball 40b. The clutch grooves 44 are provide side by side and alternately with the clutch holes 43 along the circumferential direction of the inner shaft portion 38. With this configuration, when, upon occurrence of the jammed stated in the power transmission mechanism 22, the torque of a prescribed amount or larger acts between the case portion 37 and the inner shaft portion 38 and the engagement of the clutch balls 40b with the clutch holes 43 is released, the clutch balls 40b are inserted into the clutch grooves 44. Then the clutch members 40 can be relatively displaced along the clutch grooves 44 with respect to the outer circumference of the inner shaft portion 38.

Next, the electromechanical-actuator power disconnection apparatus 10 will be described. The electromechanical-actuator power disconnection apparatus 10 is configured to break the connection of a driving force transmission path between the electric motor 21 and the screw portion 30, which is the rotational portion in the present embodiment, and disconnect transmission of power. As shown in FIG. 1, the electromechanical-actuator power disconnection apparatus 10 includes the above-described electromechanical actuator 1 as well as the control unit 34, which is a control portion for controlling the electromechanical actuator 1 in the present embodiment.

The control unit 34 includes a driver 35 and an actuator controller 36. The driver 35 controls current supplied from a power source (not shown in the figures) to the electric motor 21 and the number of rotations of the electric motor 21, based on an instruction from the actuator controller 36, to drive the electric motor 21. The actuator controller 36 controls operation of the electromechanical actuator 1 via the driver 35. Note that the actuator controller 36 may constitute the control portion. That is, the control portion may be configured without the driver 35.

The actuator controller 36 controls the electromechanical actuator 1 based on an instruction signal from a superordinate computer (not shown in the figures). Thus operation of the equipment driven by the electromechanical actuator 1 is controlled based on the instruction from the superordinate computer. Furthermore, the above-mentioned position detection signal S2 transmitted by the position detector 25 isf input to the actuator controller 36, and a rotation number signal S4 detected at the resolver 28 in the electric motor 21 as a value of the number of rotations of the rotor 27 is transmitted by the resolver 28 and input to the actuator controller 36. The actuator controller 36 controls the number of rotations of the electric motor 21 via the driver 35 based on the position detection signal S2 and the rotation number signal S4, and performs feedback control on the position of the output portion 23 relative to the housing 20.

Furthermore, not only the above-mentioned load signal S1 transmitted by the load sensor 33 but also a current value signal S3 detected as a value of current supplied from the driver 35 to the electric motor 21 are input to the actuator controller 36. The current value signal S3 is, for example, detected at a current sensor (not shown in the figures) for detecting a value of current that runs through a drive line (not shown in the figures) that connects the driver 35 with the electric motor 21, and transmitted to the actuator controller 36.

The actuator controller 36 detects, based on the load signal S1 and the current value signal S3, whether or not a jammed state has occurred due to tortion or seizure, or the like, in the power transmission mechanism 22. For example, the actuator controller 36 compares, based on the load signal S1 and the current value signal S3, the value of the load acting on the output portion 23 with the value of current supplied to the electric motor 21 to detect whether or not the jammed state has occurred. More specifically, for example, the actuator controller 36 is configured to detect occurrence of the jammed state in the power transmission mechanism 22 if the value of the load acting on the output portion 23 is smaller than a prescribed value even though the value of the current supplied to the electric motor 21 is larger than a prescribed value.

Furthermore, the actuator controller 36, upon the jammed state in the power transmission mechanism 22 being detected, temporarily cancels a current limiter that sets the upper limit of the value of the current supplied to the electric motor 21. Then the actuator controller 36 supplies current with which excessive torque, which is torque that exceeds an upper-limit torque value set as the upper limit of the toque size at the time of operation of the electromechanical actuator 1 (i.e., at the time of normal operation in which the position of the output portion 23 relative to the housing 20 is controlled), can be generated to the electric motor 21 for a prescribed time period. This prescribed time period may be set to be a very short moment.

With the above configuration, the excessive torque that exceeds the upper-limit torque value is output by the electric motor 21, and the torque of a prescribed amount or larger acts between the case portion 37 and the inner shaft portion 38. Thus the clutch members 40 break the connection between the case portion 37 and the inner shaft portion 38 and disconnect power transmission.

Next, the electromechanical-actuator power disconnection method and operation of the electromechanical actuator 1 and the electromechanical-actuator power disconnection apparatus 10 according to the present embodiment will be described. The electromechanical-actuator power disconnection method in the present embodiment is used in the electromechanical actuator 1, and is configured as a method for breaking the connection of the driving force transmission path between the electric motor 21 and the screw portion 30, which is the rotational portion in the present embodiment, and disconnecting power transmission. As a result of operation of the electromechanical actuator 1 and the electromechanical-actuator power disconnection apparatus 10, the electromechanical-actuator power disconnection method in the present embodiment is implemented.

Figure 8:
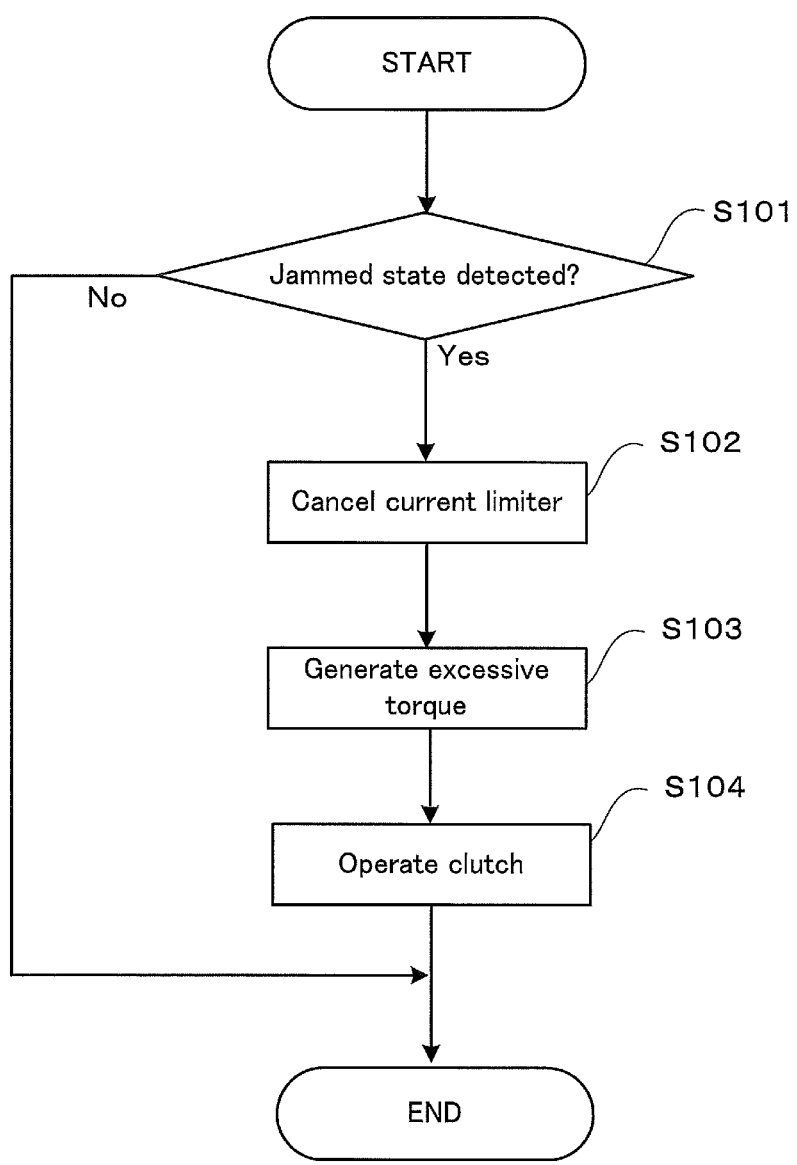
FIG. 8 is a flowchart illustrating operation of the electromechanical-actuator power disconnection apparatus shown in FIG. 1.

FIG. 8 is a flowchart illustrating the operation of the electromechanical-actuator power disconnection apparatus 10. The processing shown in the flowchart in FIG. 8 constitutes a control step in the electromechanical-actuator power disconnection method in the present embodiment. In other words, the processing shown in FIG. 8 constitutes the control step of disconnecting power transmission in the power disconnection mechanism 24 by controlling the electromechanical actuator 1 in the present embodiment.

The processing shown in FIG. 8 is repeatedly performed at the time of control of the electromechanical actuator 1 by the actuator controller 36: for example, in every prescribed operation period in the actuator controller 36. The processing shown in FIG. 8 includes a jammed state detection step S101, a current limiter cancellation step S102, an excessive torque generation step S103, and a clutch operation step S104.

Upon the start of the processing shown in FIG. 8, the jammed state detection step S101 is first performed. In the jammed state detection step S101, it is determined in the actuator controller 36 whether or not the jammed state has occurred in the power transmission mechanism 22 based on the load signal S1 and the current value signal S3. If it is determined that the jammed state has not occurred (step S101, No), the processing shown in FIG. 8 ends. On the other hand, if occurrence of the jammed state is detected (step S101, Yes), the current limiter cancellation step S102 is performed, and the current limiter that sets the upper limit of the value of the current supplied to the electric motor 21 is temporarily cancelled.

After the current limiter cancellation step S102 is performed, the excessive torque generation step S103 is performed next. In the excessive torque generation step S103, current with which excessive torque that exceeds the upper-limit torque value set as the upper limit of the torque at the time of operation of the electromechanical actuator 1 can be generated is supplied to the electric motor 21 for a prescribed time period. Thus the excessive torque is generated in the electric motor 21.

After the excessive torque generation step S103 is performed, the clutch operation step S104 is performed as well. In the clutch operation step S104, the excessive torque that exceeds the upper-limit torque value is output by the electric motor 21, and the torque of a prescribed amount or larger acts between the case portion 37 and the inner shaft portion 38. Then the clutch members 40 breaks the connection between the case portion 37 and the inner shaft portion 38 and disconnect power transmission. Thus the processing shown in FIG. 8 ends.

Figure 9A:
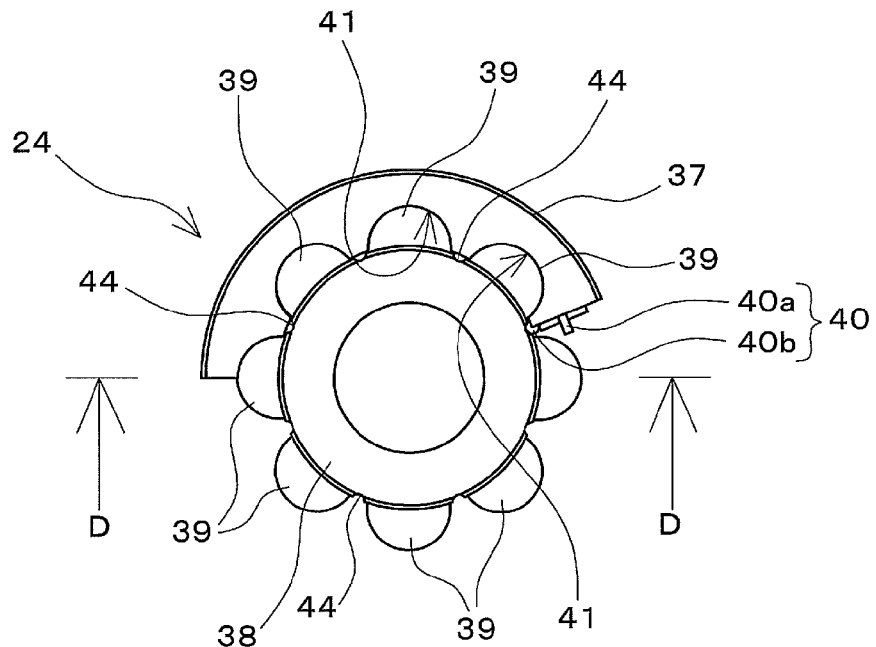
FIG. 9A is a plan view of the power disconnection mechanism shown in FIGS. 4A and 4B in a state where the mechanism operates and power is disconnected.
Figure 9B:
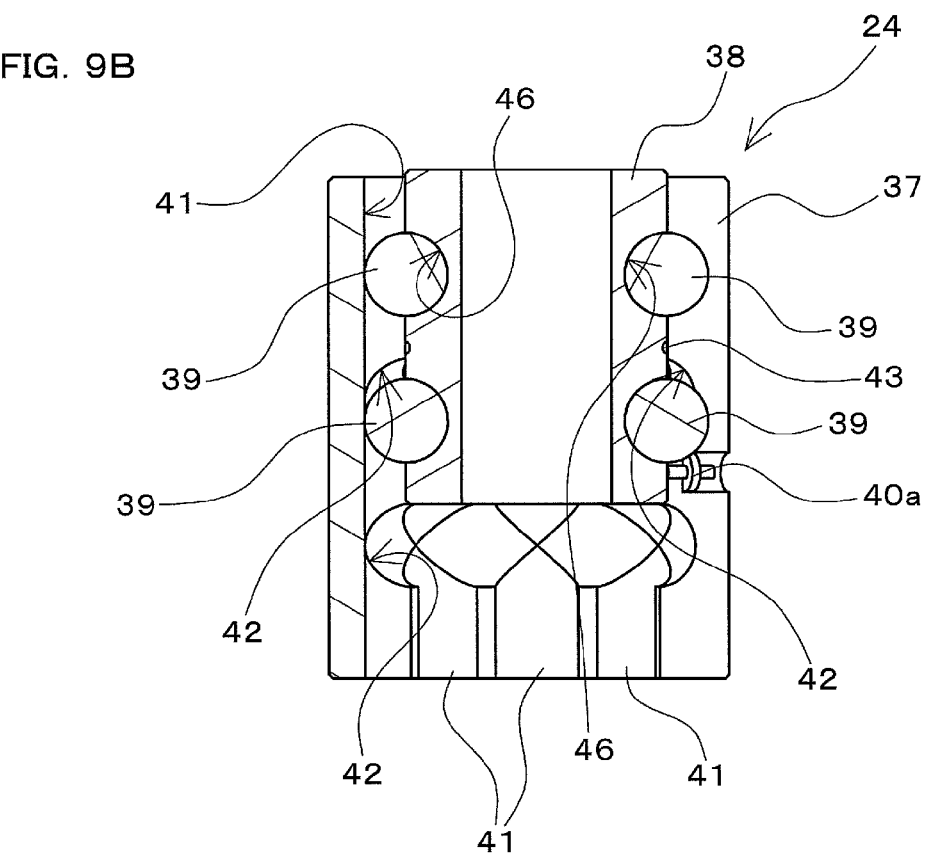
FIG. 9B is a cross-sectional view, viewed along arrows D-D in FIG. 9A.
Figure 10:
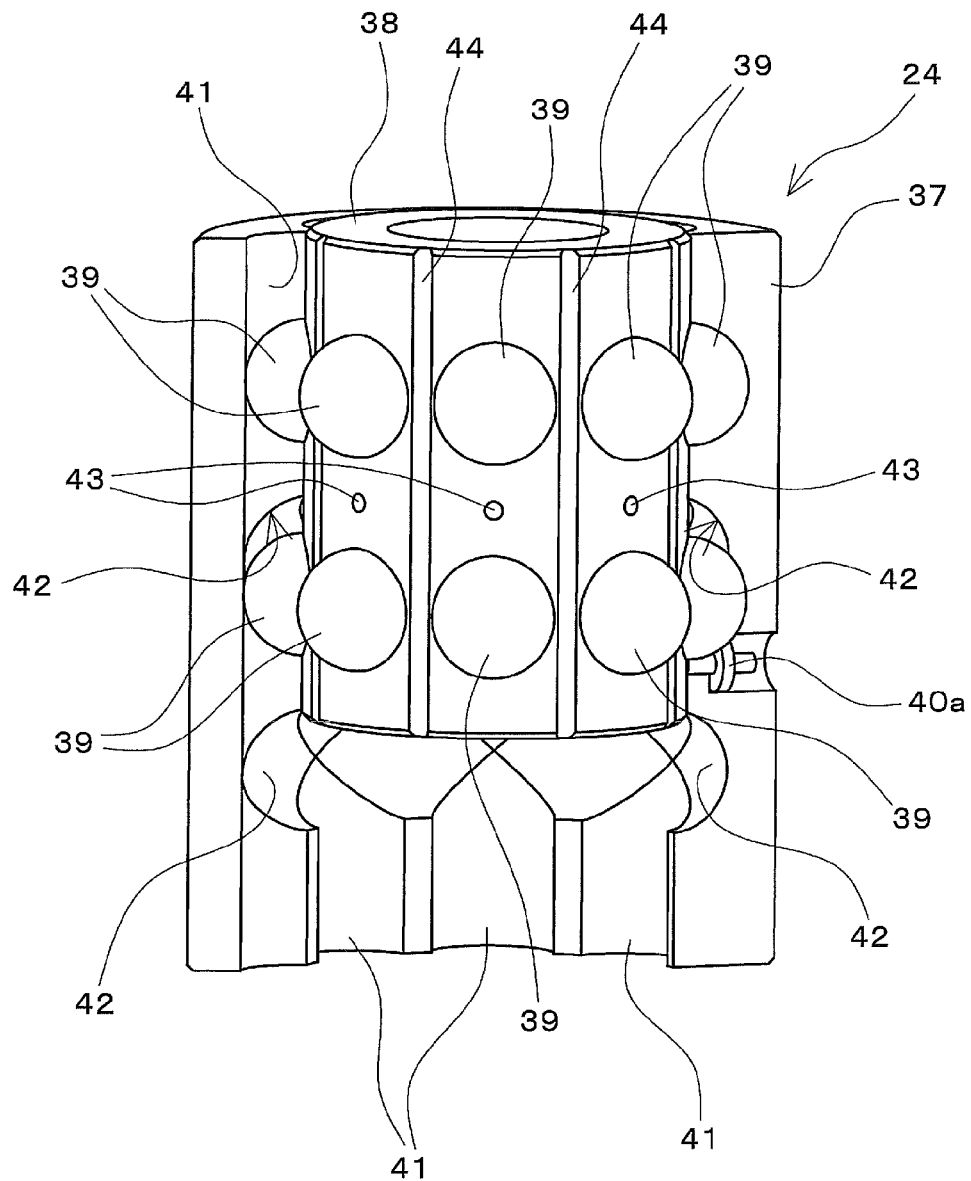
FIG. 10 is an oblique view of the power disconnection mechanism shown in FIG. 5 in a state where the mechanism operates and power is disconnected.

Here, the operation of the power disconnection mechanism 24 in the electromechanical actuator 1 when the clutch operation step S104 has performed will be described with reference to FIGS. 9 and 10. FIG. 9A is a plan view of the power disconnection mechanism 24 in a state where the power disconnection mechanism 24 has operated and power has been disconnected, and FIG. 9B is a cross-sectional view thereof. FIG. 10 is an oblique view of the power disconnection mechanism 24 in a state where the power disconnection mechanism 24 has operated and power has been disconnected. Note that FIG. 9 are partially cutaway views corresponding to FIG. 4, and FIG. 9B is a cross-sectional view, viewed along arrows D-D in FIG. 9A. FIG. 10 is a partially cutaway view corresponding to FIG. 5.

As shown in FIGS. 9A, 9B, and 10, in the state where the clutch operation step S104 has been performed, engagement of the clutch members 40 with the clutch holes 43 in the inner shaft portion 38 is released, and the connection between the case portion 37 and the inner shaft portion 38 is released. Upon the connection between the case portion 37 and the inner shaft portion 38 being released, the case portion 37 to which the above-mentioned excessive torque is transmitted from the electric motor 21 rotates with respect to the inner shaft portion 38. At this time, the inner shaft portion 38 does not rotate with the case portion 37, and the support balls 39 slide along the circumferential grooves 42 and are displaced relatively to the inner circumference of the case portion 37.

At the stage where the case portion 37 has rotated by a prescribed angle with respect to the inner shaft portion 38, the clutch members 40 is caused to project inward of the case portion 37 by the clutch spring at positions corresponding to the clutch grooves 44 in the inner shaft portion 38, and the clutch members 40 are inserted into the clutch grooves 44. Furthermore, in the power transmission mechanism 22 in the above-described state, the support balls 39 are located at the positions corresponding to the respective axial grooves 41 on the inner circumference of the case portion 37. Thus the support balls 39 are able to slide along the respective axial grooves 41 in a direction parallel to the axial direction of the case portion 37 and be displaced. In this state, the clutch members 40 are able to slide along the clutch grooves 44 in a direction parallel to the axial direction of the inner shaft portion 38 and be relatively displaced.

As described above, in the state where the connection between the case portion 37 and the inner shaft portion 38 in the power transmission mechanism 22 is released and power transmission is disconnected (the state shown in FIGS. 9 and 10), the inner shaft portion 38 into which the support balls 39 are inserted is able to move with respect to the case portion 37 in a direction parallel to the axial direction. Therefore, if the equipment connected to the output portion 23 is driven by an actuator other than the electromechanical actuator 1 in which the jammed state has occurred, the electromechanical actuator 1 can follow operation of another actuator so as not to impede the operation thereof.

As described above, according to the present embodiment, in a normal operation state of the electromechanical actuator 1 where the connection of the driving force transmission path between the electric motor 21 and the screw portion 30, which is the rotational portion, is not released, power is transmitted between the case portion 37 and the inner shaft portion 38 via the clutch members 40. On the other hand, if a jammed state has occurred in the power transmission mechanism 22, the torque of a prescribed amount or larger acts between the case portion 37 and the inner shaft portion 38, and the clutch members 40 break the connection between the case portion 37 and the inner shaft portion 38 and disconnect power transmission. At this time, a load (axial force) acting in a direction parallel to the axial direction in the power disconnection mechanism 24 is supported between the support balls 39 inserted into the inner shaft portion 38 and the portions defining the circumferential grooves 42 in the case portion 37. It is thus possible to suppress the above-mentioned axial force acting on the clutch members 40. Accordingly, when the jammed state has occurred in the power transmission mechanism 22, the torque of a prescribed amount or larger generated between the case portion 37 and the inner shaft portion 38 acts on the clutch members 40, and the connection between the case portion 37 and the inner shaft portion 38 is easily released.

In the state where the clutch members 40 have released the connection between the case portion 37 and the inner shaft portion 38, the case portion 37 and the inner shaft portion 38 are displaced relatively to each other in a rotational direction around the axial direction, and the support balls 39 are relatively displaced along the circumferential grooves 42. The support balls 39 are relatively displaced along the circumferential grooves 42, and thus able to move into the axial grooves 41. Thus the support balls 39 are able to relatively move along the axial direction, and the case portion 37 and the inner shaft portion 38 are able to be displaced relatively to each other along the axial direction. As a result, if the jammed state has occurred in the power transmission mechanism 22, the clutch members 40, substantially without being affected by the axial force, operate to disconnect the power transmission, and the case portion 37 and the inner shaft portion 38 are able to be displaced relatively to each other in the axial direction. Therefore, with this electromechanical actuator 1, it is possible to easily achieve shift to the state where the equipment to be driven can operate.

Moreover, with the electromechanical actuator 1, it is not necessary to provide double actuators such as in the electromechanical actuator disclosed in U.S. Pat. No. 5,214,972. Furthermore, with the electromechanical actuator 1, such a structure as that of the electromechanical actuator disclosed in US Patent Application Publication No. 2005/0103928 is not needed either. In other words, with the electromechanical actuator 1, mechanisms such as a clutch driving electric motor separate from the electric motor serving as a driving power source, a gear mechanism, a locking plate having a complicated shape, and so on, are not necessary either. Accordingly, with the electromechanical actuator 1, it is possible to employ simpler mechanisms and a smaller structure.

Accordingly, according to the present embodiment, it is possible to provide the electromechanical actuator 1 capable of easily achieve shift to the state where the equipment to be driven can operate if the jammed state has occurred, and with which simpler mechanisms and a smaller structure can be employed.

Furthermore, according to the present embodiment, each support ball 39, which is a supporting portion, is formed in a ball shape to be inserted into the inner shaft portion 38. Therefore, the structure of the supporting portion that is held by the inner shaft portion 38 and smoothly slides with respect to the case portion 37 can be easily formed.

Furthermore, according to the present embodiment, each concave portion 46 into which the support ball 39 serving as the ball-shaped supporting portion is inserted is provided as a semispherical hole. Therefore, the support balls 39 can be easily held so as to be able to smoothly slide with respect to the case portion 37. Moreover, in the case of the concave portions (47, 48) each provided as a long-hole groove, the support balls 39 can be held so as to be able to more smoothly roll with respect to the case portion 37.

Furthermore, according to the present embodiment, the connecting members are provided as the clutch members 40 for releasing the engagement for connection under the load of a prescribed amount or larger. Therefore, it is possible to achieve the connecting member of a simple structure for breaking the connection between the case portion 37 and the inner shaft portion 38 and disconnecting power transmission when toque of a prescribed amount or larger acts between the case portion 37 and the inner shaft portion 38.

Furthermore, with the electromechanical-actuator power disconnection apparatus 10 and the electromechanical-actuator power disconnection method in the present embodiment, the current with which the torque that exceeds the upper-limit torque value can be generated is supplied to the electric motor 21 only for a prescribed time period when the jammed state is detected, and it is thereby possible to easily break the connection of the driving force transmission path between the electric motor 21 and the screw portion 30, which is the rotational portion, and disconnect power transmission.

Furthermore, with the electromechanical-actuator power disconnection apparatus 10 and the electromechanical-actuator power disconnection method in the present embodiment, even if the jammed state is detected by error and the current with which the torque that exceeds the upper-limit torque value can be generated is supplied to the electric motor 21, the connection between the case portion 37 and the inner shaft portion 38 is not released unless the jammed state has actually occurred, and it is possible to prevent the power transmission from being disconnected by error.

Second Embodiment

Next, the second embodiment of the present invention will be discussed. The electromechanical actuator according to the second embodiment is configured similarly to that according to the first embodiment. The electromechanical-actuator power disconnection method according to the second embodiment used in the electromechanical actuator in the second embodiment, and the electromechanical-actuator power disconnection apparatus according to the second embodiment including the electromechanical actuator in the second embodiment are also configured similarly to those according to the first embodiment. Meanwhile, the second embodiment is different from the first embodiment with regard to the mode of the connecting members in the power disconnection mechanism in the electromechanical actuator. In the following description of the second embodiment, only the mode different from that according to the first embodiment, that is, the mode of the connecting members in the power disconnection mechanism in the electromechanical actuator will be described.

Figure 11A:
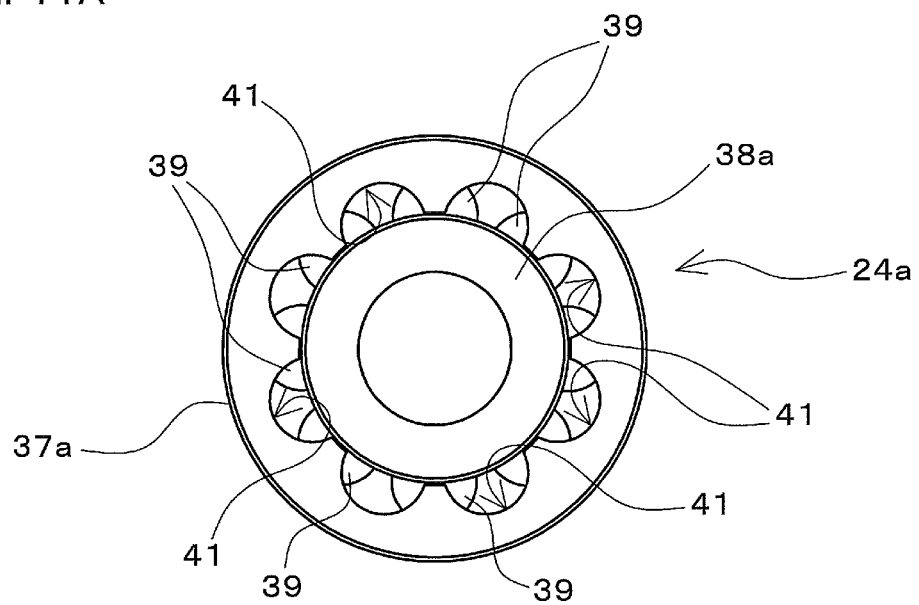
FIG. 11A is a plan view of a power disconnection mechanism in an electromechanical actuator according to a second embodiment of the present invention.
Figure 11B:
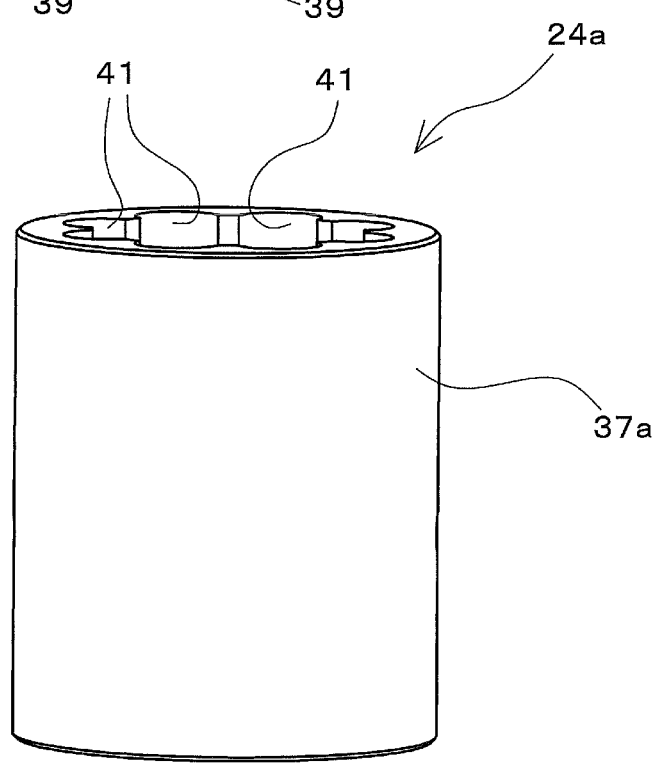
FIG. 11B is an oblique view of the power disconnection mechanism in the electromechanical actuator according to the second embodiment of the present invention.
Figure 12A:
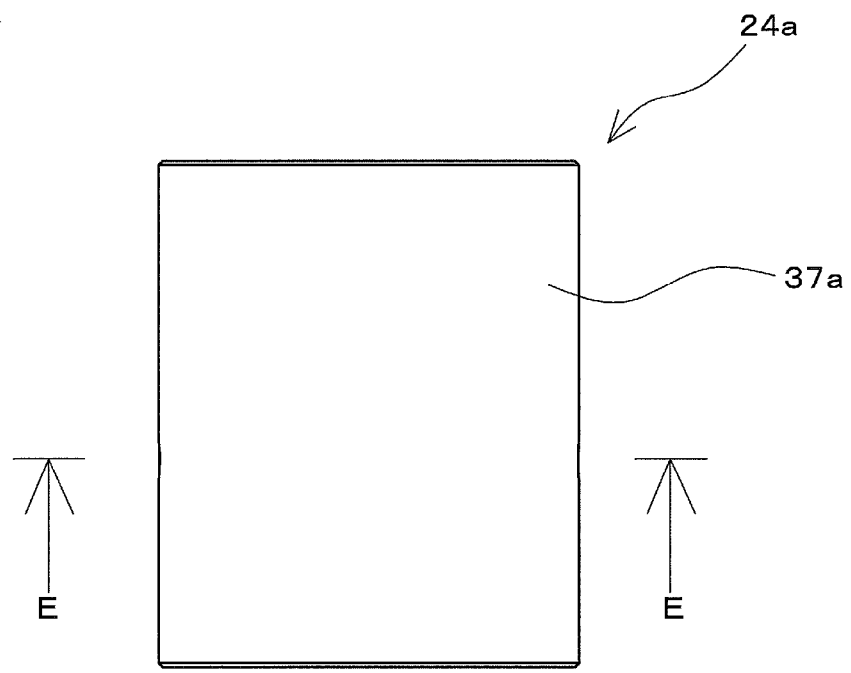
FIG. 12A is a side view of the power disconnection mechanism shown in FIGS. 11A and 11B.
Figure 12B:
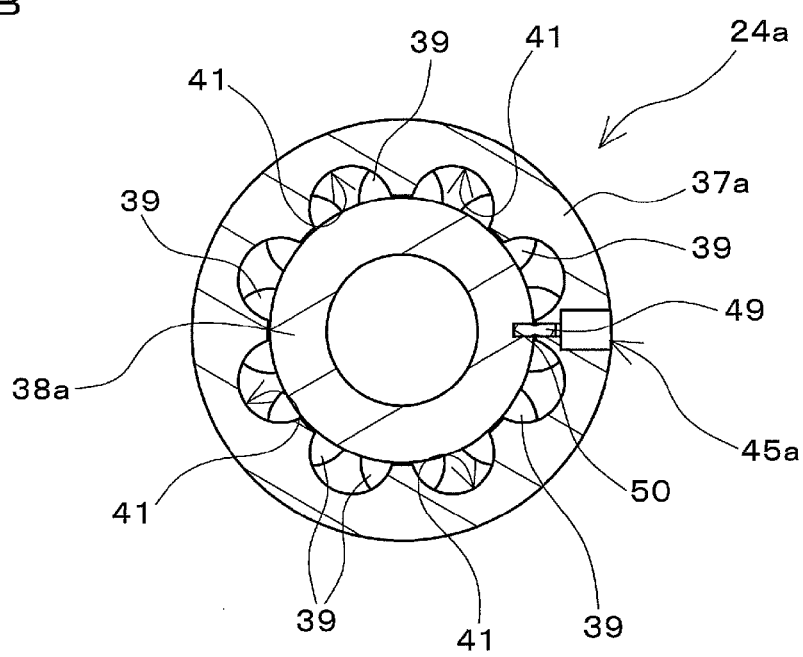
FIG. 12B is a cross-sectional view, viewed along arrows E-E in FIG. 12A.
Figure 13A:
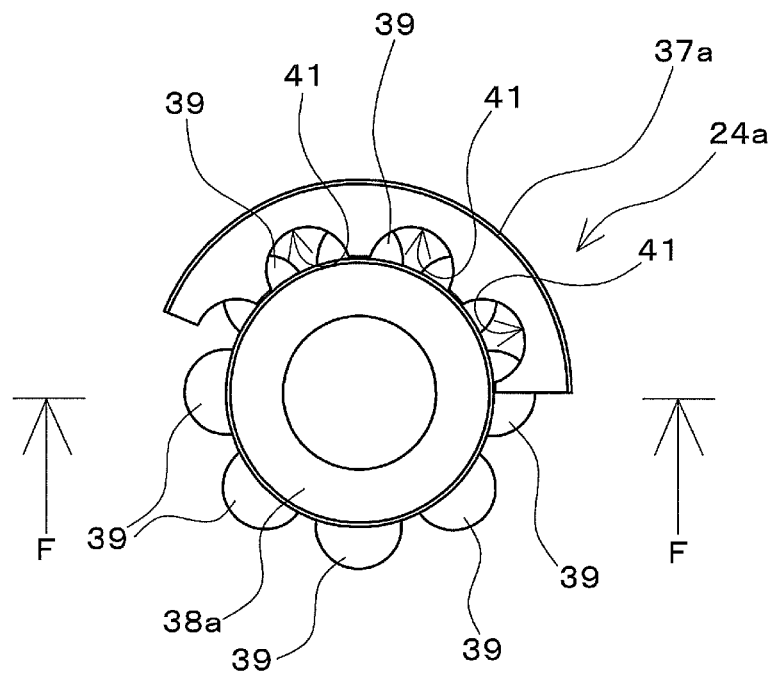
FIG. 13A is a partially cutaway plan view of the power disconnection mechanism shown in FIGS. 11A and 11B.
Figure 13B:
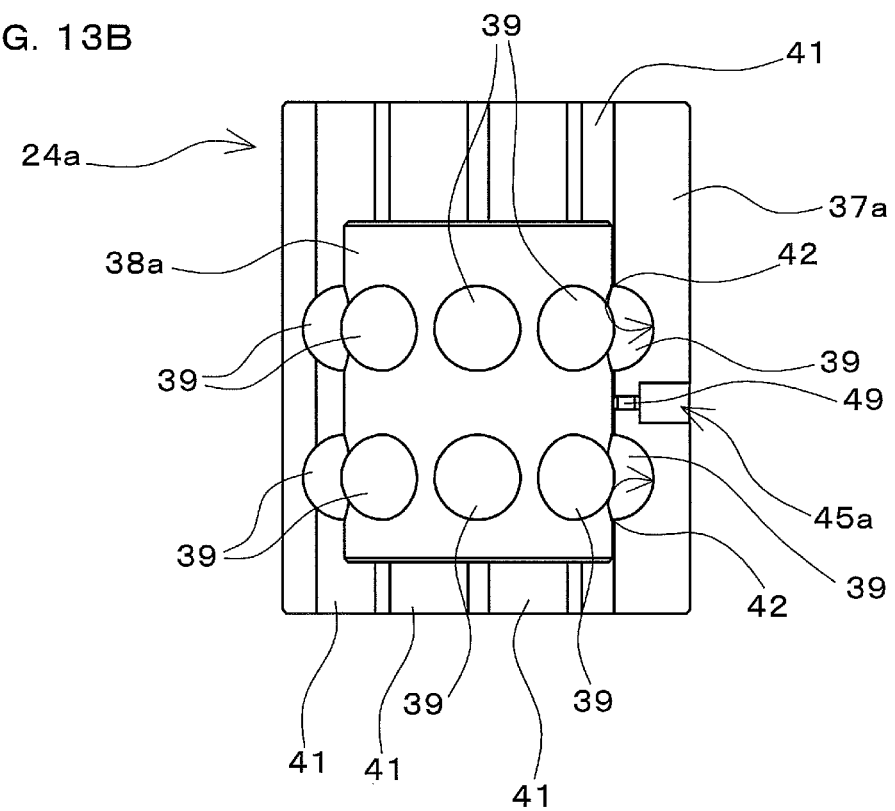
FIG. 13B is a side view, viewed along arrows F-F in FIG. 13A.

FIG. 11A is a plan view of a power disconnection mechanism 24a in the electromechanical actuator according to the second embodiment, and FIG. 11B is an oblique view thereof. FIG. 12A is a side view of the power disconnection mechanism 24a, and FIG. 12B is a cross-sectional view thereof, viewed along arrows E-E in FIG. 12A. FIG. 13A is a partially cutaway plan view of the power disconnection mechanism 24a, and FIG. 13B is a side view thereof, viewed along arrows F-F shown in FIG. 13A. Note that in the description of the second embodiment, the elements configured similarly to those according to the first embodiment are denoted by the same reference numerals in FIGS. 11A to 13B, and the description thereof will be omitted.

As shown in FIGS. 11A to 13B, in the power disconnection mechanism 24a the connecting member for connecting a case portion 37a to an inner shaft portion 38a is provided as a shear pin 49. The shear pin 49 is provided as a columnar pin-shaped member that breaks when torque of a prescribed amount or larger acts between the case portion 37a and the inner shaft portion 38a. The shear pin 49 is provided with a constricted portion formed concavely or by partially cutting out so as to extend in a groove shape along the circumferential direction of the side surface so that the shear pin 49 easily breaks when the torque of a prescribed amount or larger acts between the case portion 37a and the inner shaft portion 38a.

The shear pin 49 is installed so as to extend from the case portion 37a to the inner shaft portion 38a along the radial direction of the case portion 37a and the inner shaft portion 38a. Furthermore, the shear pin 49 is installed so as to be inserted into case portion 37a and the inner shaft portion 38a so that one end side of the shear pin 49 is held with respect to the case portion 37a while the other end portion is engaged with the inner shaft portion 38a. Note that the above-mentioned constricted portion is located so as to correspond to the position where the inner circumference of the case portion 37a comes in sliding contact with the outer circumference of the inner shaft portion 38a in the radial direction of the case portion 37a and the inner shaft portion 38a.

The case portion 37a is different from the case portion 37 in the first embodiment in that not the clutch installation holes 45 but a single shear pin installation hole 45a is provided. The shear pin installation hole 45a is provided as a hole that radially passes through the case portion 37a, and includes a hole having a diameter size that allows the inserted shear pin 49 to be held.

The inner shaft portion 38a is different from the inner shaft portion 38 in the first embodiment in that not the clutch holes 43 and the clutch grooves 44 but a single shear pin hole 50 is provided. The shear pin hole 50 is provided as a hole to be engaged with the shear pin 49 as a result of an end portion of the shear pin 49 that is held by the case portion 37a and projects radially inward of the case portion 37a being inserted to the shear pin hole 50.

The above-described electromechanical actuator, the electromechanical-actuator power disconnection apparatus, and the electromechanical-actuator power disconnection method according to the second embodiment can also achieve the same effect as in the first embodiment. Furthermore, according to the second embodiment, the connecting member is provided as the shear pin 49, which is a pin-shaped member that breaks under a load of a prescribed amount or larger. Therefore, it is possible to achieve the connecting member of a simple structure for breaking the connection between the case portion 37a and the inner shaft portion 38a and disconnecting power transmission when the toque of a prescribed amount or larger acts between the case portion 37a and the inner shaft portion 38a.

Third Embodiment

Next, the third embodiment of the present invention will be discussed. The electromechanical actuator according to the third embodiment is configured similarly to that according to the first embodiment. The electromechanical-actuator power disconnection method according to the third embodiment used in the electromechanical actuator in the third embodiment, and the electromechanical-actuator power disconnection apparatus according to the third embodiment including the electromechanical actuator in the third embodiment are also configured similarly to those according to the first embodiment. Meanwhile, the third embodiment is different from the first embodiment with regard to the mode of the connecting member in the power disconnection mechanism in the electromechanical actuator. In the following description of the third embodiment, only the mode different from that according to the first embodiment, that is, the mode of the connecting member in the power disconnection mechanism in the electromechanical actuator will be described.

Figure 14A:
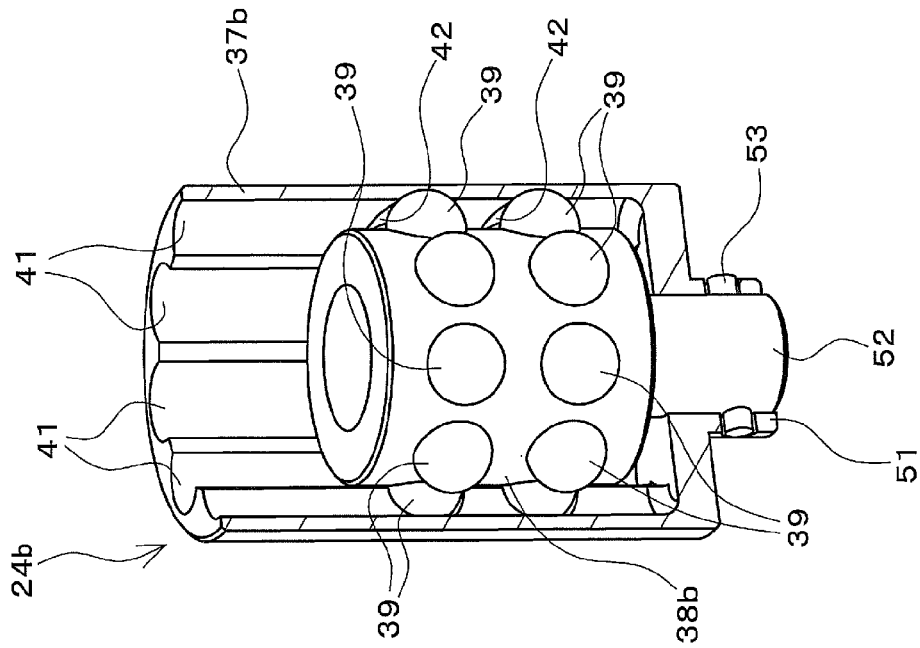
FIG. 14A is a partially cutaway side view of a power disconnection mechanism in an electromechanical actuator according to a third embodiment of the present invention.
Figure 14B:
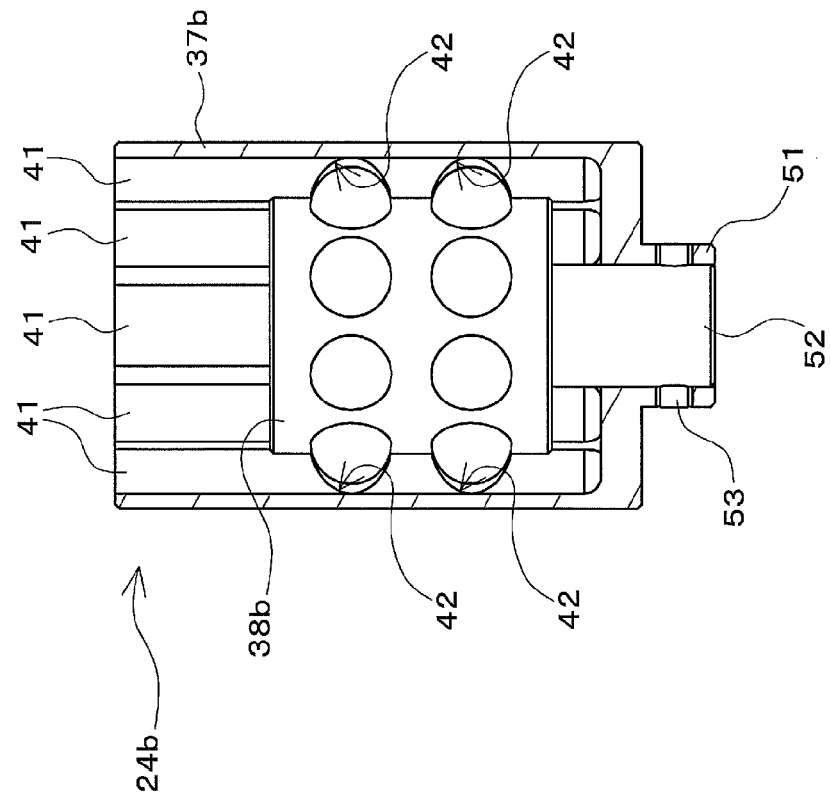
FIG. 14B is a partially cutaway oblique view of the power disconnection mechanism in the electromechanical actuator according to the third embodiment of the present invention.

FIG. 14A is a partially cutaway side view of a power disconnection mechanism 24b in the electromechanical actuator according to the third embodiment, and FIG. 14B is a partially cutaway oblique view thereof. Note that in the description of the third embodiment, the elements configured similarly to those according to the first embodiment are denoted by the same reference numerals in FIGS. 14A and 14B, and the description thereof will be omitted.

As shown in FIGS. 14A and 14B, in the power disconnection mechanism 24b the connecting member for connecting a case portion 37b to an inner shaft portion 38b is provided as a shear pin 53. The shear pin 53 is provided as a columnar pin-shaped member that breaks when torque of a prescribed amount or larger acts between the case portion 37b and the inner shaft portion 38b.

The case portion 37b is different from the case portion 37 in the first embodiment in that the clutch installation holes 45 are not provided, and that a case-side connecting portion 51 to be connected to the inner shaft portion 38b is further provided. The case-side connecting portion 51 is located in tandem in the axial direction with the case main body portion provided with the axial grooves 41 and the circumferential grooves 42 in the case 37b. This case-side connecting portion 51 is configured as a cylindrical portion integrated with the above-mentioned case main body portion.

The inner shaft portion 38b is different from the inner shaft portion 38 in the first embodiment in that the clutch holes 43 and the clutch grooves 44 are not provided and that a shaft-side connecting portion 52 to be connected to the case portion 37b is further provided. The shaft-side connecting portion 52 is located in tandem in the axial direction with a shaft main body of the inner shaft portion 38b into which the support balls 39 are inserted. This shaft-side connecting portion 52 is configured as a shaft-like portion integrated with the above-mentioned shaft main body portion. The shaft-side connecting portion 52 is installed inward of the case-side connecting portion 51. Furthermore, in a state where connection by the shear pin 53 is released, the outer circumference of the shaft-side connecting portion 52 is located so as to be able to slide in the axial direction and the circumferential direction with respect to the inner circumference of the case-side connecting portion 51.

The shear pin 53 is installed so as to extend along the diameter direction of the case-side connecting portion 51 and the shaft-side connecting portion 52 and pass through from one side to the other side of the case-side connecting portion 51 through the shaft-side connecting portion 52. The shear pin 53 is installed so as to be inserted into the case portion 37b and the inner shaft portion 38b so that the center of the shear pin 53 is held with respect to the shaft-side connecting portion 52, while both end portions are engaged with the case-side connecting portion 51.

The above-described electromechanical actuator, the electromechanical-actuator power disconnection apparatus, and the electromechanical-actuator power disconnection method according to the third embodiment can also achieve the same effect as in the first embodiment. Furthermore, according to the third embodiment, the connecting member is provided as the shear pin 53, which is a pin-shaped member that breaks under a load of a prescribed amount or larger. Therefore, it is possible to achieve the connecting member of a simple structure for breaking the connection between the case portion 37h and the inner shaft portion 38b and disconnecting power transmission when the toque of a prescribed amount or larger acts between the case portion 37h and the inner shaft portion 38b.

Fourth Embodiment

Next, the fourth embodiment of the present invention will be discussed. The electromechanical actuator according to the fourth embodiment is configured similarly to that according to the first embodiment. The electromechanical-actuator power disconnection method according to the fourth embodiment used in the electromechanical actuator in the fourth embodiment, and the electromechanical-actuator power disconnection apparatus according to the fourth embodiment including the electromechanical actuator in the fourth embodiment are also configured similarly to those according to the first embodiment. Meanwhile, the fourth embodiment is different from the first embodiment with regard to the mode of connection between the electric motor and the power disconnection mechanism in the electromechanical actuator. In the following description of the fourth embodiment, only the mode different from that according to the first embodiment, that is, the mode of connection between the electric motor and the power disconnection mechanism in the electromechanical actuator will be described.

Figure 15:
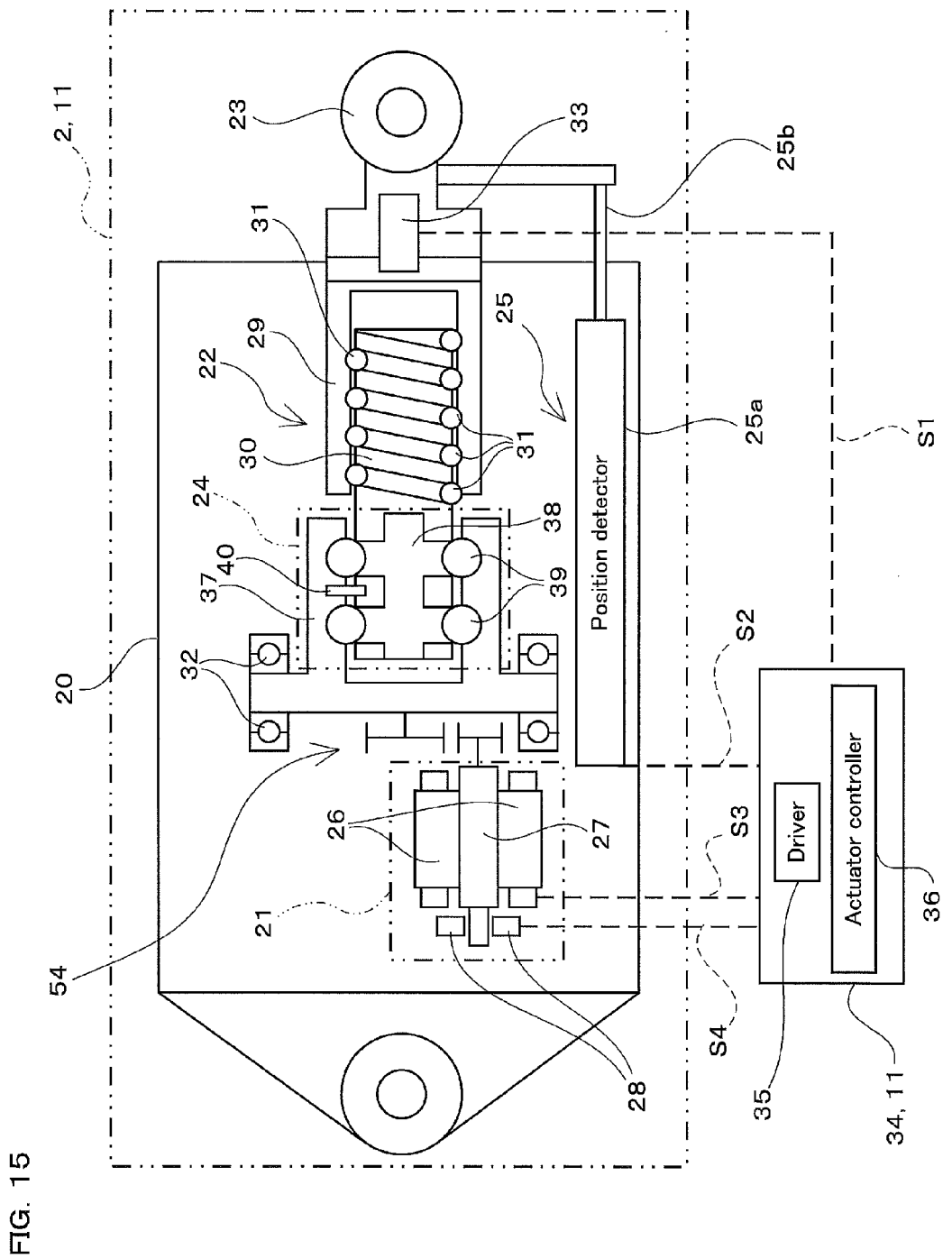
FIG. 15 is a schematic view of an electromechanical actuator according to a fourth embodiment of the present invention, and an electromechanical-actuator power disconnection apparatus including the electromechanical actuator.

FIG. 15 is a schematic view of an electromechanical actuator 2 and an electromechanical-actuator power disconnection apparatus 11 including this electromechanical actuator 2 according to the fourth embodiment of the present invention. Note that in the description of the fourth embodiment, the elements configured similarly to those according to the first embodiment are denoted by the same reference numerals in FIG. 15, and the description thereof will be omitted.

As shown in FIG. 15, in the electromechanical actuator 2 and the electromechanical-actuator power disconnection apparatus 11, the electric motor 21 and the power disconnection mechanism 24 are connected to each other via a gear portion 54. The gear portion 54 is configured as, for example, a deceleration mechanism having a plurality of spur gears. A pinion gear having a small diameter in the gear portion 54 is fixed with respect to the rotor 27 in the electric motor 21, and a spur gear having a large diameter to be engaged with the above-mentioned small-diameter pinion gear is fixed to the case portion 37. Thus the case portion 37 is connected to the electric motor 21 via the gear portion 54.

The electromechanical actuator, the electromechanical-actuator power disconnection apparatus, and the electromechanical-actuator power disconnection method according to the fourth embodiment can also achieve the same effect as in the first embodiment.

Fifth Embodiment

Next, the fifth embodiment of the present invention will be discussed. The electromechanical actuator according to the fifth embodiment is configured similarly to that according to the first embodiment. The electromechanical-actuator power disconnection method according to the fifth embodiment used in the electromechanical actuator in the fifth embodiment, and the electromechanical-actuator power disconnection apparatus according to the fifth embodiment including the electromechanical actuator in the fifth embodiment are also configured similarly to those according to the first embodiment. Meanwhile, the fifth embodiment is different from the first embodiment with regard to the mode of the power transmission mechanism in the electromechanical actuator. In the following description of the fifth embodiment, only the mode different from that according to the first embodiment, that is, the mode of the power transmission mechanism in the electromechanical actuator will be described.

Figure 16:
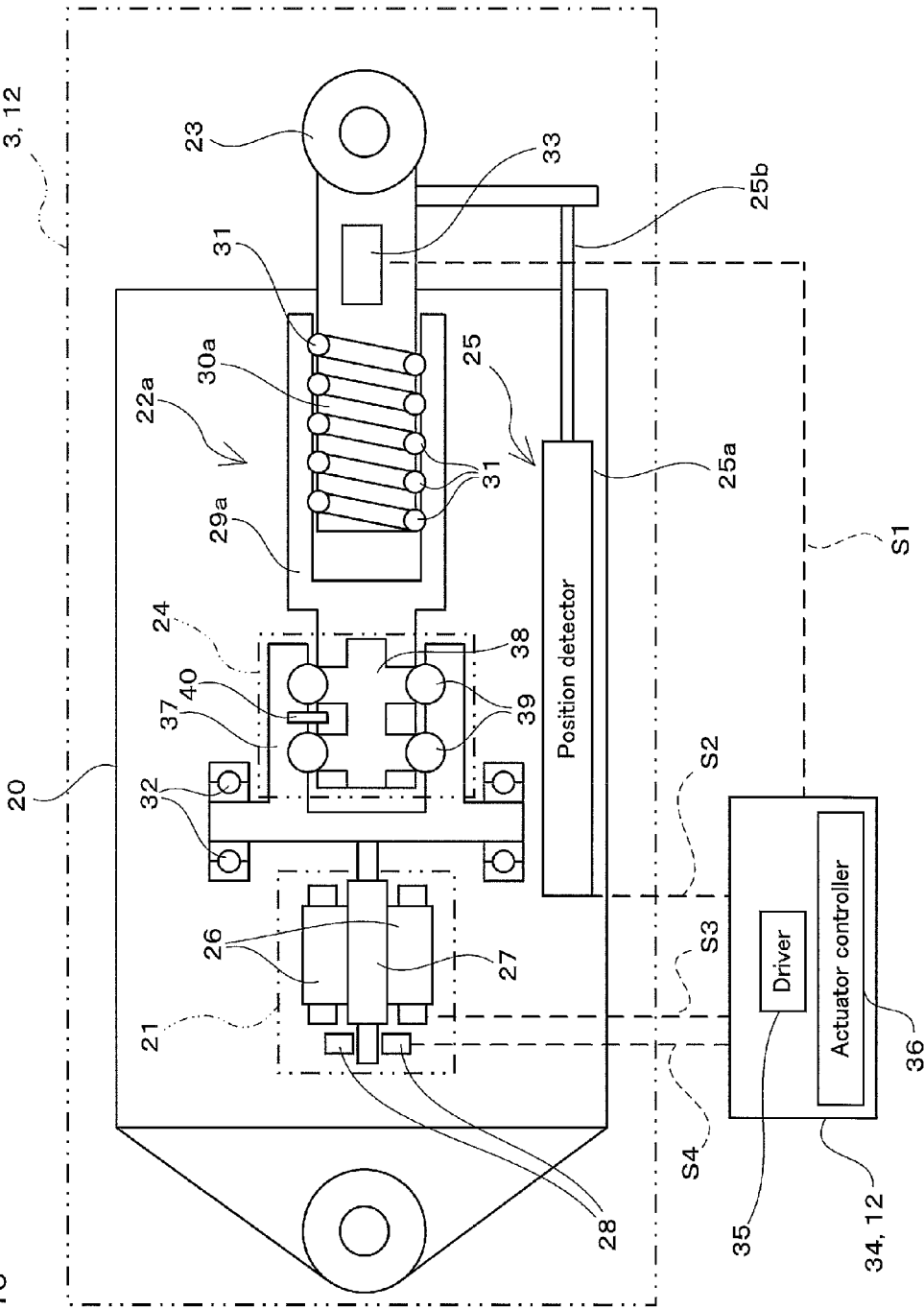
FIG. 16 is a schematic view of an electromechanical actuator according to a fifth embodiment of the present invention, and an electromechanical-actuator power disconnection apparatus including the electromechanical actuator.

FIG. 16 is a schematic view of an electromechanical actuator 3 and an electromechanical-actuator power disconnection apparatus 12 including this electromechanical actuator 3 according to the fifth embodiment of the present invention. Note that in the description of the fifth embodiment, the elements configured similarly to those according to the first embodiment are denoted by the same reference numerals in FIG. 16, and the description thereof will be omitted.

As shown in FIG. 16, in the electromechanical actuator 3 and the electromechanical-actuator power disconnection apparatus 12, a power transmission mechanism 22a has a nut portion 29a and a screw portion 30a that are provided so as to be able to rotate relatively to each other around the same axis, and a plurality of balls 31 located between the nut portion 29a and the screw portion 30a. That is, the power transmission mechanism 22a is provided as a ball screw mechanism, similarly to that according to the first embodiment, and is configured so that the plurality of balls 31 circulate while rolling between thread grooves provided on the inner circumference of the nut portion 29a and thread grooves provided on the outer circumference of the screw portion 30a.

Here, in the power transmission mechanism 22a, the nut portion 29a is supported so as to be able to rotate together with the power disconnection mechanism 24 that is supported by the bearings 32 so as to be able to rotate with respect to the housing 20 and rotates together with the rotor 27. Meanwhile, the screw portion 30a is supported slidably with respect to the housing 20. Thus the power transmission mechanism 22a is configured to convert the driving force of the electric motor 21 in a rotational direction into driving force in a linear direction and transmit the driving force as a result of the nut portion 29a and the screw portion 30a rotating relatively to each other.

Furthermore, in the power transmission mechanism 22a, the nut portion 29a rotates around its axis, and the screw portion 30a is thereby displaced parallel to its axial direction. That is, in the power transmission mechanism 22a, of the nut portion 29a and the screw portion 30a, the screw portion 30a constitutes the linear displacement portion that is displaced in a linear direction. Meanwhile, of the nut portion 29a and the screw portion 30a, the nut portion 29a constitutes a rotational portion that rotates upon rotation of the electric motor 21 being transmitted thereto.

The above-described electromechanical actuator, the electromechanical-actuator power disconnection apparatus, and the electromechanical-actuator power disconnection method according to the fifth embodiment can achieve the same effect as in the first embodiment.

Although the first to fifth embodiments of the present invention have been described thus far, the present invention is not limited to the embodiments described above, and various modifications may be made within the scope recited in the claims. For example, the following modifications are possible.

(1) The first embodiment has been described, taking, as an example, the mode in which the case portion is fixed with respect to the electric motor, and the inner shaft portion is fixed with respect to the rotational portion that is one of the nut portion and the screw portion and rotates upon the rotation of the electric motor being transmitted thereto. However, this need not be the case. A mode in which the inner shaft portion is fixed with respect to, or connected via a gear portion to, the electric motor, and the case portion is fixed with respect to the rotational portion may alternatively be implemented.

(2) Although the first to third embodiment have been described, taking, as an example, the mode in which the supporting portion is inserted into the inner shaft portion and slidable with respect to the case portion, this need not be the case. A mode in which the supporting portion is integrated with the inner shaft portion may alternatively be implemented. Alternatively, a mode in which the supporting portion is integrated with, or inserted into, the case portion, and rollable or slidable with respect to the inner shaft portion may be implemented. In the case of the mode in which the supporting portion is integrated with, or inserted into, the case portion, a mode in which semi-cylindrical portions formed by dividing a cylindrical portion into halves along its cross-section extending in the axial direction are integrally combined with each other to form the case portion may be implemented, for example. It is thus easy to integrate, or insert, the supporting portion with/into the inside of the case portion. Moreover, in the case where the supporting portion is integrated with, or inserted into, the case portion, the axial grooves and the circumferential grooves are provided in the inner shaft portion.

(3) Although the first to third embodiments have been described, taking, as an example, the mode in which each supporting portion is formed in a ball shape, this need not be the case. For example, the supporting portion may be formed as a cylindrical roller.

(4) Although the first embodiment has been described, taking, as an example, the clutch members with which the engagement with the inner shaft portion is released when torque of a prescribed amount or larger acts between the case portion and the inner shaft portion, this need not be the case. Clutch members whose engagement with the case portion is released when the torque of a prescribed amount or larger acts between the case portion and the inner shaft portion may alternatively be implemented.

The present invention can be widely applied to an electromechanical actuator provided with an electric motor, a power transmission mechanism that has a nut portion and a screw portion, converts driving force in a rotational direction into driving force in a linear direction, and transmitting the driving force, and an output portion that is displaced in a linear direction and outputs the driving force, and an electromechanical-actuator power disconnection method and an electromechanical-actuator power disconnection apparatus for breaking connection of a driving force transmission path in the electromechanical actuator and disconnecting transmission of power. The present invention is not limited to the above-described embodiments, and all modifications, applications and equivalents thereof that fall within the claims, for which modifications and applications would become apparent by reading and understanding the present specification, are intended to be embraced therein.

What is claimed is:

1. An electromechanical actuator, comprising:
    an electric motor that generates driving force in a rotational direction;
    a power transmission mechanism that has a nut portion and a screw portion, converts the driving force of the electric motor in a rotation direction into driving force in a linear direction, and transmits the driving force as a result of the nut portion and the screw portion rotating relatively to each other; and
    an output portion that outputs driving force in a linear direction by being displaced together with one of the nut portion and the screw portion that serves as a linear displacement portion that is displaced in the linear direction,
    the electromechanical actuator further comprising a power disconnection mechanism capable of breaking connection of a driving force transmission path between the electric motor and one of the nut portion and the screw portion that serves as a rotational portion that rotates upon rotation of the electric motor being transmitted thereto, and disconnecting transmission of power,
    the power disconnection mechanism comprising:
    a case portion that has a cylindrical hollow portion and is fixed with respect to, or connected via a gear portion to, one of the rotational portion and the electric motor;
    an inner shaft portion that has a shaft-like portion and is installed within the case portion and is fixed with respect to, or connected via the gear portion to, the other of the rotational portion and the electric motor;
    a supporting portion that is installed between the case portion and the inner shaft portion so as to be able to support a load acting in a direction parallel to an axial direction of the case portion and the inner shaft portion, integrated with, or inserted into, one of the case portion and the inner shaft portion, and rollable or slidable with respect to the other of the case portion and the inner shaft portion; and
    a connecting member that connects the case portion to the inner shaft portion,
    wherein the other of the case portion and the inner shaft portion is provided with an axial groove along which the supporting portion can roll or slide, and that extends parallel to the axial direction of the case portion and the inner shaft portion, and a circumferential groove along which the supporting portion can roll or slide, and that extends along the circumferential direction of the case portion and the inner shaft portion, and
    the connecting member breaks connection between the case portion and the inner shaft portion and disconnects transmission of the power when torque of a prescribed amount or larger acts between the case portion and the inner shaft portion.

2. The electromechanical actuator according to claim 1, wherein the supporting portion is formed in a ball shape, and is inserted into one of the case portion and the inner shaft portion.

3. The electromechanical actuator according to claim 2, wherein one of the case portion and the inner shaft portion is provided with a concave portion that is concavely formed so that the supporting portion can be inserted therein, and the concave portion is provided as a semispherical hole or a long-hole groove.

4. The electromechanical actuator according to claim 3, wherein the connecting member is provided as a pin-shaped member that breaks when the torque of the prescribed amount or larger acts between the case portion and the inner shaft portion, or as a clutch member whose engagement with one of the case portion and the inner shaft portion is released when the torque of a prescribed amount or larger acts between the case portion and the inner shaft portion.

5. The electromechanical actuator according to claim 2, wherein the connecting member is provided as a pin-shaped member that breaks when the torque of the prescribed amount or larger acts between the case portion and the inner shaft portion, or as a clutch member whose engagement with one of the case portion and the inner shaft portion is released when the torque of a prescribed amount or larger acts between the case portion and the inner shaft portion.

6. The electromechanical actuator according to claim 1, wherein the connecting member is provided as a pin-shaped member that breaks when the torque of the prescribed amount or larger acts between the case portion and the inner shaft portion, or as a clutch member whose engagement with one of the case portion and the inner shaft portion is released when the torque of a prescribed amount or larger acts between the case portion and the inner shaft portion.

7. An electromechanical-actuator power disconnection method, used in an electromechanical actuator which includes:
   an electric motor that generates driving force in a rotational direction;
   a power transmission mechanism that has a nut portion and a screw portion, converts the driving force of the electric motor in a rotation direction into driving force in a linear direction, and transmits the driving force as a result of the nut portion and the screw portion rotating relatively to each other; and
   an output portion that outputs driving force in a linear direction by being displaced together with one of the nut portion and the screw portion that serves as a linear displacement portion that is displaced in the linear direction, and
   a power disconnection mechanism including:
      a case portion that has a cylindrical hollow portion and is fixed with respect to, or connected via a gear portion to, one of the rotational portion and the electric motor;
      an inner shaft portion that has a shaft-like portion and is installed within the case portion and is fixed with respect to, or connected via the gear portion to, the other of the rotational portion and the electric motor;
      a supporting portion that is installed between the case portion and the inner shaft portion so as to be able to support a load acting in a direction parallel to an axial direction of the case portion and the inner shaft portion, integrated with, or inserted into, one of the case portion and the inner shaft portion, and is rollable or slidable with respect to the other of the case portion and the inner shaft portion; and
      a connecting member that connects the case portion to the inner shaft portion,
      wherein the other of the case portion and the inner shaft portion is provided with an axial groove in which the supporting portion can roll or slide, and that extends parallel to the axial direction of the case portion and the inner shaft portion, and a circumferential groove in which the supporting portion can roll or slide, and that extends along the circumferential direction of the case portion and the inner shaft portion, and
   said electromechanical-actuator power disconnection method comprising the steps of
   breaking connection of a driving force transmission path between the electric motor and one of the nut portion and the screw portion that serves as a rotational portion that rotates upon rotation of the electric motor being transmitted thereto, and
   controlling the electromechanical actuator in such a manner that:
   upon a jammed state in the power transmission mechanism being detected, current with which torque that exceeds an upper-limit torque value that is set as an upper limit of an amount of the torque at the time of operation of the electromechanical actuator can be generated is supplied to the electric motor for a prescribed time period, and
   as a result of the torque that exceeds the upper-limit torque value being output by the electric motor, the torque of a prescribed amount or larger acts between the case portion and the inner shaft portion, the connecting member breaks the connection between the case portion and the inner shaft portion, and transmission of power is disconnected.

8. An electromechanical-actuator power disconnection apparatus, comprising an electromechanical actuator including:
   an electric motor that generates driving force in a rotational direction;
   a power transmission mechanism that has a nut portion and a screw portion, converts the driving force of the electric motor in a rotation direction into driving force in a linear direction, and transmits the driving force as a result of the nut portion and the screw portion rotating relatively to each other; and
   an output portion that outputs driving force in a linear direction by being displaced together with one of the nut portion and the screw portion that serves as a linear displacement portion that is displaced in the linear direction,
   the electromechanical-actuator power disconnection apparatus for breaking connection of a driving force transmission path between the electric motor and one of the nut portion and the screw portion that serves as a rotational portion that rotates upon rotation of the electric motor being transmitted thereto, and disconnecting transmission of power,
   the electromechanical-actuator power disconnection apparatus, further comprising: a power disconnection mechanism that is provided in the electromechanical actuator and is capable of breaking connection of the transmission path and disconnecting transmission of power; and
   a control portion that controls the electromechanical actuator,
   the power disconnection mechanism including:
   a case portion that has a cylindrical hollow portion and is fixed with respect to, or connected via a gear portion to, one of the rotational portion and the electric motor;
   an inner shaft portion that has a shaft-like portion and is installed within the case portion and is fixed with respect to, or connected via the gear portion to, the other of the rotational portion and the electric motor;
   a supporting portion that is installed between the case portion and the inner shaft portion so as to be able to support a load acting in a direction parallel to an axial direction of the case portion and the inner shaft portion, integrated with, or inserted into, one of the case portion and the inner shaft portion, and is rollable or slidable with respect to the other of the case portion and the inner shaft portion; and a connecting member that connects the case portion to the inner shaft portion, wherein the other of the case portion and the inner shaft portion is provided with an axial groove in which the supporting portion can roll or slide, and that extends parallel to the axial direction of the case portion and the inner shaft portion, and a circumferential groove in which the supporting portion can roll or slide, and that extends along the circumferential direction of the case portion and the inner shaft portion, the control portion supplies, upon a jammed state in the power transmission mechanism being detected, current with which torque that exceeds an upper-limit torque value that is set as an upper limit of an amount of the torque at the time of operation of the electromechanical actuator can be generated, to the electric motor for a prescribed time period, and as a result of the torque that exceeds the upper-limit torque value being output by the electric motor, the torque of a prescribed amount or larger acts between the case portion and the inner shaft portion, the connecting member breaks the connection between the case portion and the inner shaft portion, and transmission of power is disconnected.

* * * * *